US006686321B2

(12) United States Patent
Boden et al.

(10) Patent No.: US 6,686,321 B2
(45) Date of Patent: *Feb. 3, 2004

(54) POLAR GRAFTED POLYOLEFINS, METHODS FOR THEIR MANUFACTURE, AND LUBRICATING OIL COMPOSITIONS CONTAINING THEM

(75) Inventors: Frederick J. Boden, Somerset, NJ (US); Richard P. Sauer, North Plainfield, NJ (US); Irwin L. Goldblatt, Edison, NJ (US); Michael E. McHenry, Washington, NJ (US)

(73) Assignee: Castrol Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/973,585

(22) Filed: Oct. 9, 2001

(65) Prior Publication Data

US 2002/0042349 A1 Apr. 11, 2002

Related U.S. Application Data

(63) Continuation of application No. 09/469,867, filed on Dec. 22, 1999, now Pat. No. 6,300,289, which is a continuation of application No. 09/252,755, filed on Feb. 19, 1999, now abandoned, which is a continuation of application No. 08/920,393, filed on Aug. 29, 1997, now Pat. No. 5,874,389, which is a continuation of application No. 08/541,832, filed on Oct. 10, 1995, now Pat. No. 5,663,126, which is a continuation-in-part of application No. 08/327,508, filed on Oct. 21, 1994, now Pat. No. 5,523,008.

(51) Int. Cl.$^7$ ..................... C10M 149/10; C08F 279/02
(52) U.S. Cl. ..................... 508/221; 508/543; 525/279; 525/281; 525/282; 525/283; 525/293; 525/296; 525/309; 525/315
(58) Field of Search .................... 508/221, 543

(56) References Cited

U.S. PATENT DOCUMENTS

| | | | |
|---|---|---|---|
| 3,417,054 A | 12/1968 | Merijan et al. | 260/66 |
| 3,728,319 A | 4/1973 | Kiesel et al. | 260/88.1 R |
| 4,068,058 A | 1/1978 | Engel et al. | 526/49 |
| 4,085,055 A | 4/1978 | Durand et al. | 252/50 |
| 4,092,255 A | 5/1978 | Chapelet et al. | 252/50 |
| 4,098,710 A | 7/1978 | Elliott et al. | 252/51.5 |
| 4,100,086 A | 7/1978 | Larkin et al. | 252/50 |
| 4,146,489 A | 3/1979 | Stambaugh et al. | 252/50 |
| 4,160,739 A | 7/1979 | Stambaugh et al. | 252/34 |
| 4,229,308 A | 10/1980 | Brulet et al. | 252/47 |
| 4,229,311 A | 10/1980 | Wenzel et al. | 252/50 |
| 4,263,418 A | 4/1981 | Steffen et al. | 525/277 |
| 4,281,081 A | 7/1981 | Jost et al. | 525/281 |
| 4,290,925 A | 9/1981 | Penniwiss et al. | 252/56 |
| 4,320,019 A | 3/1982 | Hayashi | 252/51 |
| 4,338,418 A | 7/1982 | Jost et al. | 525/281 |
| 4,496,691 A | 1/1985 | Proux et al. | 525/73 |
| 4,519,929 A | 5/1985 | O'Brien et al. | 252/51.5 |
| 4,618,439 A | 10/1986 | Brandi et al. | 252/47.5 |
| 4,640,788 A | 2/1987 | Kapuscinski et al. | 252/51.5 R |

(List continued on next page.)

FOREIGN PATENT DOCUMENTS

| | | |
|---|---|---|
| CA | 2029842 | 5/1991 |
| DE | 2905954 | 8/1980 |
| DE | 3001045 A1 | 7/1981 |
| EP | 032175 | 7/1981 |
| EP | 0164807 A2 | 12/1985 |
| EP | 0201164 A2 | 3/1986 |
| EP | 0199453 A2 | 10/1986 |
| EP | 0400867 A1 | 5/1990 |
| EP | 0430528 A1 | 11/1990 |
| EP | 0440506 A3 | 8/1991 |
| GB | 1511520 | 5/1978 |
| GB | 1558991 | 1/1980 |
| GB | 1601079 | 10/1981 |
| WO | WO 91/13952 | 9/1991 |
| WO | WO 92/15622 | 9/1992 |
| WO | WO 01/19882 | 3/2001 |

OTHER PUBLICATIONS

Consumer Reports, "What's Best for your Car—Tests of: Motor Oils Filters, Batteries Filter Wrenches Tire Gaugues, Motor Oils—All Brands are not Created Equal," pp. 88–94 (Feb., 1987).
Lubricants World, *Ester Base Stocks Synergize With ZDP* pp. 49–50 (Oct., 1996).
Mamajek, "Lubricants World," *Bright Future for Viscosity Modifiers*, pp. 12–13 (Aug., 1995).
Mooney Chemicals, Inc., *Material Safety Data Sheet*, (Code 416) (Aug. 9, 1990).
OMG Group, Inc. 6% Iron Nap–All (no date).
Saunders, Hart's Lubricants World, *New Base Oils Rescue Future Specs.* pp. 20, 24 & 26 (Nov., 1996).

Primary Examiner—Ellen M. McAvoy
(74) Attorney, Agent, or Firm—McAndrews, Held & Malloy, Ltd.

(57) ABSTRACT

A grafted polyolefin containing one or more of N-vinylimidazole, 4-vinylpyridine, or other ethylenically-unsaturated nitrogen-containing or oxygen-containing graftable monomers grafted to a polyolefin copolymer is disclosed. The grafted polyolefin preferably has a weight average molecular weight of from about 20,000 to about 500,000, a polydispersity of less than about 10, and an ADT value of at least about 8. The grafted polyolefin can be defined as containing more than about 1.2% by weight of grafted monomer on a polyolefin, or as containing at least about 13 moles of graftable monomers per mole of polyolefin, or as having an asphaltene dispersancy test (ADT) value of at least about 8. Also described is a lubricating oil comprising a lubricant base oil and a grafted polyolefin as described above. Also described is a method of making a dispersant viscosity index improver. N-vinyl-imidazole or other ethylenically unsaturated nitrogen-containing and/or oxygen-containing graftable monomers and a graftable polyolefin are reacted with enough of an initiator to graft the monomer to the polyolefin. The initiator and/or graftable monomer is added to the other ingredients, maintained at the reaction temperature, over a period of time. The reaction temperature is maintained at a level high enough to give acceptable reaction times. The N-vinylimidazole and the initiator each can be added at a uniform, relatively slow rate during the reaction.

92 Claims, No Drawings

U.S. PATENT DOCUMENTS

| | | | |
|---|---|---|---|
| 4,693,838 A | 9/1987 | Varma et al. | 252/51.5 R |
| 4,699,723 A | 10/1987 | Kapuscinski et al. | 252/47 |
| 4,707,285 A | 11/1987 | Brewster et al. | 252/50 |
| 4,715,975 A | 12/1987 | Kapuscinski et al. | 252/52 R |
| 4,734,213 A | 3/1988 | Brewster et al. | 252/52 R |
| 4,769,043 A | 9/1988 | Kapuscinski et al. | 44/62 |
| 4,780,228 A | 10/1988 | Gardiner et al. | 252/51 |
| 4,810,754 A | 3/1989 | McCrary | 525/264 |
| 4,820,776 A | 4/1989 | Kapuscinski et al. | 525/279 |
| 4,863,623 A | 9/1989 | Nalesnik | 252/50 |
| 4,877,415 A | 10/1989 | Kapuscinski et al. | 44/62 |
| 4,886,611 A | 12/1989 | Kapuscinski et al. | 252/47 |
| 4,904,404 A | 2/1990 | Liu et al. | 252/51.5 R |
| 4,922,045 A | 5/1990 | White et al. | 585/10 |
| 4,952,637 A | 8/1990 | Kapuscinski et al. | 525/279 |
| 5,035,820 A | 7/1991 | Rhodes et al. | 252/50 |
| 5,075,383 A | 12/1991 | Migdal et al. | 525/293 |
| 5,132,371 A | 7/1992 | Sasaki et al. | 525/301 |
| 5,153,270 A | 10/1992 | Roncetti et al. | 525/245 |
| 5,164,451 A | 11/1992 | Kato et al. | 525/282 |
| 5,167,845 A | 12/1992 | DeRosa et al. | 252/47.5 |
| 5,182,041 A | 1/1993 | Benfarmeo et al. | 252/51.5 |
| 5,205,949 A | 4/1993 | Nalesnik et al. | 252/50 |
| 5,210,146 A | 5/1993 | Gutierrez et al. | 525/301 |
| 5,284,913 A | 2/1994 | Sasaki et al. | 525/66 |
| 5,294,354 A | 3/1994 | Papke et al. | 252/18 |
| 5,298,565 A | 3/1994 | Lange et al. | 525/279 |
| 5,308,523 A | 5/1994 | DeRosa et al. | 252/51.5 |
| 5,312,556 A | 5/1994 | Chung et al. | 252/51.5 |
| 5,328,624 A | 7/1994 | Chung | 252/51.5 |
| 5,356,551 A | 10/1994 | Chung et al. | 252/51.5 A |
| 5,424,357 A | 6/1995 | Larson | 524/765 |
| 5,424,366 A | 6/1995 | Kapuscinski et al. | 525/279 |
| 5,424,367 A | 6/1995 | Auda et al. | 525/285 |
| 5,466,753 A | 11/1995 | Marczinke et al. | 525/193 |
| 5,474,693 A | 12/1995 | Kapuscinski et al. | 252/50 |
| 5,523,008 A | 6/1996 | Boden et al. | 252/50 |
| 5,534,171 A | 7/1996 | Derosa et al. | 508/231 |
| 5,565,161 A | 10/1996 | Auda et al. | 264/11.24 |
| 5,622,926 A | 4/1997 | Schade et al. | 510/340 |
| 5,624,999 A | 4/1997 | Lombardi et al. | 525/52 |
| 5,650,468 A | 7/1997 | Vandevijver et al. | 525/285 |
| 5,651,927 A | 7/1997 | Auda et al. | 264/85 |
| 5,652,202 A | 7/1997 | Adams | 508/232 |
| 5,663,126 A | 9/1997 | Boden et al. | 508/221 |
| 5,698,637 A | 12/1997 | Aarila | 525/285 |
| 5,721,200 A | 2/1998 | Shirodkar et al. | 508/221 |
| 5,744,429 A | 4/1998 | Chung et al. | 508/221 |
| 5,814,586 A | 9/1998 | Boden et al. | 508/221 |
| 5,874,389 A | 2/1999 | Boden et al. | 508/221 |
| 5,883,196 A | 3/1999 | Rath et al. | 525/285 |
| 5,929,172 A | 7/1999 | Zajaczkowski | 525/284 |
| 5,969,050 A | 10/1999 | Vandevijver et al. | 525/285 |
| 6,300,289 B1 | 10/2001 | Boden et al. | 508/221 |

POLAR GRAFTED POLYOLEFINS, METHODS FOR THEIR MANUFACTURE, AND LUBRICATING OIL COMPOSITIONS CONTAINING THEM

CROSS-REFERENCE TO RELATED APPLICATION

This application is a continuation of U.S. Ser. No. 09/469,867, filed Dec. 22, 1999, to issue as U.S. Pat. No. 6,300,289, which is a continuation of U.S. Ser. No. 09/252,755, filed Feb. 19, 1999, abandoned, which is a continuation of U.S. Ser. No. 08/920,393, filed Aug. 29, 1997, issued as U.S. Pat. No. 5,874,389, which is a continuation of U.S. Ser. No. 08/541,832, filed Oct. 10, 1995, issued as U.S. Pat. No. 5,663,126, which is a continuation-in-part of U.S. Ser. No. 08/327,508, filed Oct. 21, 1994 issued as U.S. Pat. No. 5,523,008. Those applications are hereby entirely incorporated by reference herein.

TECHNICAL FIELD

The present invention relates to novel grafted polymers with polyolefin backbones. The polyolefin backbones preferably have pendant unsaturation. The polyolefins are grafted with ethylenically unsaturated nitrogen-containing and/or oxygen-containing monomers.

The present invention further relates to methods for manufacturing these novel grafted polyolefins. The invention still further relates to lubricating oil compositions containing these novel grafted polyolefins as dispersant viscosity index improvers.

BACKGROUND OF THE INVENTION

Grafted copolymers of nitrogenous, heterocyclic monomers with polyolefins having pendant ethylenically unsaturated moieties have previously been proposed for use in lubricating oils as viscosity index improving (VII) agents and as dispersants for keeping the insoluble materials in the crankcase of an internal combustion engine in suspension. Among many graftable polyolefins suggested for this use are ethylene-propylene polyolefins, grafted with 0.3% by weight of N-vinylimidazole. U.S. Pat. No. 4,092,255, col. 10, ll. 52–53. Other examples in the same patent are "statistic" copolymers, which are distinguished from grafted copolymers. U.S. Pat. No. 4,092,255, col. 4, ll. 5–13.

Another material which has been suggested for use as both a viscosity index improver and a dispersant is a polymer containing N-vinyl pyrrolidone and an alkyl methacrylate. U.S. Pat. No. 4,146,489, col. 1, ll. 51–62.

Previous dispersant viscosity index improvers ("DVII's"), including grafted copolymers of N-vinylimidazole and olefinic polymers, have typically provided an ADT (asphaltene dispersancy test) value of from about 2 to about 4. A dispersant viscosity index improver (DVII) having a higher ADT value would be able to disperse the insoluble material in a lubricating oil composition when less of the dispersant is used in the oil. Thus, a DVII having a higher ADT value would be a better dispersant than the currently available materials.

Now consider the manufacture of grafted polyolefins. Grafted polyolefins for use as lubricating oil additives have previously been prepared by dissolving the selected polyolefin in a solvent (which may be a lubricating oil base stock), adding an organic peroxide as a free radical generator (also referred to in this specification as an initiator), holding the mixture at an elevated temperature to form active sites on the polyolefin, adding the graftable monomer, and allowing the mixture to react at an elevated temperature for long enough to form the desired grafted polyolefin. U.S. Pat. No. 4,092,255, col. 4, l. 54, to col. 5, l. 12.

The prior art also suggests that the grafting reaction to form a dispersant VII grafted polyolefin can be controlled to avoid by-products by combining the polyolefin, graftable monomer, and initiator at a temperature below the initiation (reaction) temperature of the initiator, then heating the mixture to above that initiation (reaction) temperature to begin the reaction. U.S. Pat. No. 4,146,489. Example 1 of the '489 patent suggests that the initiation (reaction) temperature of di-t-butyl peroxide is between 160□ C and 170□ C. Addition of the initiator in two stages is suggested in Example 4 of the same patent. A grafted polyolefin containing 1–10% by weight, preferably 2–6% by weight, most preferably about 3% by weight of the grafted monomer is taught. '489 patent, col. 3, ll. 11–15.

One problem with prior grafted polyolefins is their limited shear stability—the ability to withstand extensive shearing, as in an internal combustion engine, without losing potency as viscosity-index improving additives. U.S. Pat. No. 4,146,489, col. 5, ll. 48–58, states that: "During the grafting reaction, noticeable thickening takes place, and evaluation of the grafted polyolefin indicates that shear stability deteriorates during the grafting reaction. This very likely results from crosslinking that may occur as part of the reaction. Although it is possible to eliminate this crosslinking, the products so prepared generally are inferior dispersants. Hence, it appears to be inherent to some extent in the grafting process of this invention that to obtain optimum dispersancy, some compromise in shear stability is necessary."

The '489 patent also points out that the shear stability of the grafted copolymer can be improved by mechanical or thermal degradation of the polyolefin to reduce the content of high-molecular-weight species which are readily broken down by such processes. However, it is not desirable to carry out the time-consuming and expensive processes necessary to mechanically or thermally degrade the polyolefin.

Another manner proposed for preventing side reactions in the grafting process, which are said to include cross-linking of polyolefin chains, homopolymerization of the graftable monomer, or functionalization of the grafted polyolefins, is to run the reaction at a relatively high temperature, such as 190□ C or more if, for example, di-t-butyl peroxide is used as an initiator. This expedient is also said to allow the proportion of grafted monomer in the resulting product to be increased, as well. U.S. Pat. No. 4,810,754, col. 2, ll. 19–43.

A grafting reaction has been carried out, according to Example 1 of U.S. Pat. No. 4,810,754, by adding the initiator (di-t-butyl peroxide) and the graftable monomer (2-vinylpyridine—molecular weight 105.14) over a period of 45 minutes to an ethylene-propylene polyolefin reaction mixture maintained in a solvent mineral oil at 190□ C. The resulting grafted polyolefin was said to contain as much as 0.17% nitrogen by one analysis. If accurate, this nitrogen level would indicate 1.3% by weight of vinylpyridine monomer grafted on the polyolefin.

OBJECTIVES OF THE INVENTION

One objective of the invention is to provide novel grafted polyolefins with polyolefin backbones (preferably having pendant unsaturation) grafted with ethylenically unsaturated nitrogen or oxygen-containing monomers.

An additional objective of the present invention is to provide a dispersant viscosity index improver ("DVII")

which has an ADT dispersancy of from about 8 to about 32 or more—higher than the ADT dispersancies of previous nitrogen or oxygen grafted polyolefin DVII's.

Another objective of the invention is to provide such grafted polyolefins which contain higher molar proportions of the grafted monomer to the polyolefin than previously known grafted polyolefins—such as a 13:1, 15:1, 25:1, 50:1, or even higher grafted monomer: backbone mole ratio—without substantially increasing the molecular weight or decreasing the shear stability of the grafted polyolefin versus the ungrafted polyolefin starting materials.

Still another objective of the invention is to provide lubricating oil compositions containing these novel grafted polyolefins in amounts effective to function both as viscosity index improvers and as dispersants.

Still another objective of the invention is to provide such grafted polyolefins which minimally require use of additives which increase the low temperature viscosity of oil blends. These oil blends therefore can contain a higher-viscosity base stock. The use of a higher-viscosity base stock provides better lubrication at high operating temperatures and reduces the proportion of volatile species.

An additional objective of the invention is to provide methods for manufacturing these novel grafted polyolefins.

One or more of the preceding objectives, or one or more other objectives which will become plain upon consideration of the present specification, are satisfied at least in part by the invention described herein.

SUMMARY OF THE INVENTION

One aspect of the invention, which satisfies one or more of the above objectives, is the graft copolymer reaction product of a nitrogenous, ethylenically unsaturated, aliphatic or aromatic monomer having from 2 to about 50 carbon atoms grafted on a polyolefin. The grafted polyolefin has an ADT value of at least about 8.

Another aspect of the invention is a method of making a dispersant viscosity index improver. According to this invention, a graftable monomer) and a polyolefin having graftable unsaturation are provided. Enough of an initiator is provided to graft the graftable monomer to the polyolefin.

The polyolefin is dissolved in a solvent, forming a solution. The graftable monomer and the initiator are added to the solution. The graftable monomer and particularly) the initiator can be added gradually to the reaction mixture, and they can be added together or successively. The rate of addition of the graftable monomer can be from 0.1% to 100% of the entire charge of monomer per minute. The rate of addition of the initiator can be from about 0.1% to about 40% of the initiator charge per minute. The reaction temperature is maintained at a level which gives rise to a satisfactory reaction initiation rate. In one embodiment, the graftable monomer and the initiator are each added at a uniform, relatively slow rate during the reaction.

The resulting grafted polyolefin has an ADT of about 8, and desirably has a kinematic viscosity at 100□ C of less than about 13,000 centistokes when used at 12.5% by weight (solids) in oil.

Yet another aspect of the invention is the graft reaction product of a graftable monomer selected from the group consisting of:
N-vinylimidazole;
C-vinylimidazole
1-vinyl-2-pyrrolidinone;
N-allyl imidazole;
1-vinyl pyrrolidinone;
2-vinyl pyridine;
4-vinyl pyridine;
N-methyl-N-vinylacetamide;
diallylformamide;
N-methyl-N-allylformamide;
N-ethyl-N-allylformamide;
N-cyclohexyl-N-allylformamide;
4-methyl-5-vinylthiazole;
N-allyldiisooctylphenothiazine;
2-methyl-1-vinylimidazole
3-methyl-1-vinylpyrazole
N-vinylpurine
N-vinylpiperazines
N-vinylsuccinimide
Vinylpiperidines
Vinylmorpholines
and combinations of these, grafted on a polyolefin copolymer having pendant sites for receiving grafts of said graftable monomers. The graft reaction product has an ADT value of at least about 2.

The graft reaction product is made by melt-blending a reaction mixture consisting essentially of a graftable monomer; a polyolefin copolymer having pendant graftable sites; and an initiator. The reaction is carried out at a temperature and under conditions effective to graft the monomer on at least some of the pendant graftable sites of said polyolefin copolymer.

Another aspect of the invention is a lubricating oil comprising a hydrocarbon base oil and a grafted polyolefin as described above. The grafted polyolefin functions as a dispersant viscosity index improver, and has the property of raising the viscosity index of the lubricating oil blend by at least about 20 points when used at a 1 wt. % solids concentration in the blend. (The dispersant viscosity index improver may, however, be used in an amount which is more or less than 1% by weight solids of a lubricating oil composition.)

Such a lubricating oil employs both the superior dispersancy and the viscosity improving properties of the grafted polyolefin, so less of the oil composition than before is occupied by dispersants and viscosity improving ingredients. For example, a 10W-30 lubricating oil can be formulated which employs more of a low-volatility conventional base stock (which has a higher viscosity) than previous formulations. This allows the formulator greater latitude to formulate a multi-viscosity composition which will stay within the viscosity specifications of the grade, provide equal or superior performance, and yet contain less volatiles from the base stock.

A significant benefit of the present invention is that the reduction in the amount of conventional dispersants increases the wear resistance of the composition in an internal combustion engine.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the claims concluding this specification.

The novel grafted polyolefin according to the present invention is made by reacting a polyolefin (preferably having pendant ethylenic unsaturation) and a polar, ethylenically unsaturated, preferably nitrogen-containing, preferably heterocyclic graftable monomer, in the presence of an initiator. The reaction may be carried out on the solid polyolefin in an extrusion reactor, in the molten polyolefin, or in a solvent.

Reaction Materials

The following are examples of polyolefins, graftable monomers, initiators, solvents, and optional inhibitors contemplated for use herein to make the present grafted polyolefin.

Polyolefins

A wide variety of polyolefins (preferably having pendant unsaturation) are contemplated for use herein as a backbone for grafting. Several examples of polyolefins contemplated for use herein include the polyolefins suggested by U.S. Pat. No. 4,092,255, col. 1, ll. 29–32: polyisobutene, polyalkylstyrenes, partially hydrogenated polyolefins of butadiene and styrene, amorphous polyolefins of ethylene and propylene, and isoprene copolymers. EPDM (ethylene/propylene/diene monomer) rubbers are also contemplated for use herein.

Particular materials contemplated for use herein include ethylene/propylene/diene polyolefins containing from about 30% to about 80% ethylene and from about 70% to about 20% propylene moieties by number, optionally modified with from 0% to about 9% diene monomers. Several examples of diene monomers are 1,4-butadiene, isoprene, 1,4-hexadiene, dicyclopentadiene, 2,5-norbornadiene, ethylidene-norbornene, the dienes recited in U.S. Pat. No. 4,092,255, col. 2, ll. 36–44 (which are incorporated by reference here), or combinations of more than one of them.

The polyolefins contemplated herein may have weight average molecular weights of from about 20,000 to about 500,000 and polydispersities from about 1 to about 15.

Specific materials which are contemplated for use herein include: ORTHOLEUM 2052 or 2053 vulcanizable elastomers, which are polyolefins of principally ethylene, propylene, and 1,4-hexadiene having a CAS Number of 25190-87-8. These elastomers are believed to have weight average molecular weights ranging from 100,000 to 120,000, with an overall average of about 114,000 (U.S. Pat. No. 4,519,929) and a polydispersity of about 2.5. These elastomers are sold as lubricant assistants by E. I. Du Pont de Nemours & Co., Wilmington, Del. Other polyolefins contemplated for use in this invention include NORDEL hydrocarbon rubbers, CAS No. 25038-37-1, which are terpolymers of ethylene, propylene, and 1,4-hexadiene sold by E. I. Du Pont de Nemours & Co., Wilmington, Del.; NDR-4523, NDR-6987, DU2052, DU2053, DU1320, and DU9323 EPDM polymers, also sold by Du Pont; Mitsui VISNEX polyolefins, which are polyolefins of ethylene, propylene, and ethylidene-norbornene, CAS No. 25038-36-2, sold by Mitsui Petrochemical Industries, Ltd., Tokyo, Japan; VISTALON ethylene/propylene polyolefins, sold by Exxon Chemical Americas, Houston, Tex.; SV-250 hydrogenated isoprene copolymer, sold by Shell Chemical Co., Houston, Tex.; combinations of the above materials; and other, similar materials.

Graftable Monomers

Broadly, any of the graftable monomers previously used to graft polyolefins are also contemplated for use herein. For example, the monomers recited in U.S. Pat. No. 4,146,489, column 4, lines 2 through 41; ("The preferred monomer which is grafted to the olefinic backbone is 2-vinylpyridine. However, N-vinyl pyrrolidone or other polar C-vinylpyridines may be used, such as 2-vinylpyridine, 4-vinylpyridine, and lower alkyl ($C_1$–$C_8$) substituted C-vinylpyridines, such as 2-methyl-5-vinylpyridine, 2-methyl-4-vinylpyridine, 2-vinyl-5-ethyl pyridine, and 2-vinyl-6-methylpyridine.

Other polar nitrogen containing grafting monomers may be used in minor amounts with N-vinyl pyrrolidone or the C-vinylpyridines. These include dimethylaminoethyl methacrylate or acrylate, vinylimidazole, N-vinylcarbazole, N-vinylsuccinimide, acrylonitrile, o-, m-, or p-aminostyrene, maleimide, N-vinyl oxazolidone, N,N-dimethylaminoethyl vinyl ether, ethyl 2-cyanoacrylate, vinyl acetonitrile, N-vinylphthalimide, and 2-vinylquinoline; a variety of acrylamides and methacrylamides such as N-[1,1-dimethyl-3-oxobutyl] acrylamide, N-[1,2-dimethyl-1-ethyl-3-oxobutyl] acrylamide, N-(1,3-diphenyl-1-methyl-3-oxopropyl)acrylamide, N-(1-methyl-1-phenyl-3-oxobutyl) methacrylamide, N,N-diethylaminoethyl acrylamide, and 2-hydroxyethyl acrylamide. A variety of N-vinylcaprolactams or their thioanalogs, other than or in addition to N-vinylpyrrolidone, may be used in minor amounts. These include N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones; N-vinylbenzyldimethylamine, N-dimethylaminopropyl acrylamide and methacrylamide, N-methacryloxyethylpyrrolidone, N-methacryloxyethylmorpholinone, N-methacryloxyethylmorpholine, N-maleimide of dimethylaminopropylamine, and the N-methacrylamide of aminoethylethyleneurea."), U.S. Pat. No. 4,092,255, from column 2, line 45, to column 3, line 47; ("The nitrogenous heterocyclic monomers of the imidazole or imidazoline type are more particularly the vinylimidazoles and vinylimidazolines having the vinyl group in the 1 or 2 position, i.e. on the substitutable nitrogen atom or on the carbon atom in alpha position of said nitrogen atom, and the compounds derived from these monomers by substituting the hydrogen atoms linked to the heterocycle carbons by monovalent hydrocarbon groups having 1 to 8 carbon atoms selected from the group comprising the alkyl, aryl, aralkyl and alkaryl radicals, possibly aminated, and/or by substituting the hydrogen atoms of the two adjacent carbon atoms of the heterocycle by a divalent hydrocarbon group, possibly aminated, having 4 to 8 carbon atoms to form with said adjacent carbon atoms of the heterocycle a carbon nucleus, and particularly an aromatic nucleus. Non-limitative examples of such nitrogenous monomers are N-vinylimidazole (also called vinyl-1-imidazole), N-vinylmethyl-2-imidazole, N-vinylethyl-2-imidazole, N-vinylphenyl-2-imidazole, N-vinyldimethyl-2,4-imidazole, N-vinylbenzimidazole, N-vinylmethyl-2-benzimidazole, N-vinylimidazoline (also named vinyl-1-imidazoline), N-vinylmethyl-2-imidazoline, N-vinylphenyl-2-imidazoline and vinyl-2-imidazole.

. . . [T]he heterocyclic monomers . . . [of one suitable type] are unsaturated compounds constituted by a monovalent alkenyl rest [sic] having 2 to 12 carbon atoms, linked to a monovalent nitrogenous heterocyclic group derived, by removal of the hydrogen atom linked to the substitutable hetero-atom, from a compound selected from the group comprising the carbazole, the thiobenzothiazole, the phenothiazine, the lactams and thiolactams having 4 to 15 nuclear carbon atoms, and the derivatives of these compounds obtained by substituting the hydrogen atoms linked to the nuclear carbons by hydrocarbon radicals, possibly aminated and having 1 to 8 carbon atoms.

Said nitrogenous heterocyclic monomers are more particularly selected from the group comprising the alkenyl 1–2 thiobenzothiazoles, the N-alkenyl-carbazoles, the N-alkenylphenothiazines, the N-alkenyllactames, or N-alkenyl-thiolactams having 4 to 12 nuclear carbon atoms, wherein the alkenyl radical has 2 to 8 carbon atoms and wherein the unsaturation is preferably in the Ω position relative to the hetero-atom to which it is linked, and the derivatives of these compounds obtained by substituting the hydrogen atoms linked to the nuclear carbons by alkyl radicals having 1 to 6 carbon atoms, or by a phenyl radical.

Among the monomers derived from carbazole, the following may be particularly mentioned: N-vinylcarbazole, N-allylcarbazole, N-butenylcarbazole, N-hexenylcarbazole and N-(Methyl-1'ethenyle) carbazole [sic].

The monomers resulting from thiobenzothiazole and phenothiazine may be advantageously the 2-vinylthiobenzothiazole, the 2-allylthiobenzothiazole, the 2-butenylthiobenzothiazole, the N-vinylphenothiazine, the N-allylphenothiazine, the most commonly used being the 2-allylthiobenzothiazole and the N-allylphenothiazine.

As examples of monomers derived from lactams or thiolactams, the following compounds may be particularly mentioned: N-vinylpyrrolidone, N-vinylmethyl-5-pyrrolidone, N-vinylmethyl-3-pyrrolidone, N-vinylethyl-5-pyrrolidone, N-vinyldimethyl-5,5-pyrrolidone, N-vinylphenyl-5-pyrrolidone, N-allylpyrrolidone, N-vinylthiopyrrolidone, N-vinylpiperidone N-vinyl-diethyl-6,6-piperidone, N-vinylcaprolactam, N-vinylmethyl-7-caprolactam, N-vinylethyl-7-caprolactam, N-vinyldimethyl-7,7-caprolactam, N-vinylthiocaprolactam, N-allylcaprolactam, N-vinylcapryllactam."), and U.S. Pat. No. 4,810,754, from column 3, line 24, to column 4, line 4; ("Other vinyl-containing monomers include styrene, butadiene, divinylbenzene, 4-vinylpyridine and lower $C_1$–$C_8$ alkyl substituted C-vinylpyridines such as 2-methyl-5-vinylpyridine, 2-vinyl-5-ethylpyridine and 2-vinyl-6-methylpyridine. Other examples of suitable vinyl containing monomers include dimethyl-aminoethylmethacrylate or acrylate, vinylimidazole, N-vinylcarbazole, N-vinylsuccinimide, acrylonitrile, o-, m-, or p-aminostyrene, maleimide, N-vinyloxazolidone, N,N-dimethylaminoethylvinylether, ethyl-2-cyanoacrylate, vinylacetonitrile, N-vinylphthalimide, and 2-vinylquinoline; a variety of acrylamides and methacrylamides such as N-[1,1-dimethyl-3-oxobutyl] acrylamide, N-[1,2-dimethyl-1-ethyl-3-oxobutyl] acrylamide, N-(1,3-diphenyl-1-methyl-3-oxopropyl)acrylamide, N-(13-oxobutyl) methacrylamide, N,N-diethylaminoethylacrylamide, and 2-hydroxyethylacrylamide, N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones; N-vinylbenzyldimethylamine, N-dimethylaminopropylacrylamide and methacrylamide, N-methacryloxyethylpyrrolidone, N-methacryloxyethylmorpholinone, N-methacryl-oxyethylmorpholine, N-maleimide of dimethyl-aminopropylamine, and the N-methacrylamide of aminoethylethyleneurea.

Monomers containing an active methylene group can be characterized as those monomers containing a $CH_2$-unit which is adjacent to at least one strong electron withdrawing group such as sulfoxy, cyano, oxygen, carbamyl or an aromatic ring. Examples of such monomers having an active methylene group are 4-alkylmorpholine, 1,3-diphenyl-2-propanone, benzoylacetonitrile, hydrocinnamonitrile, dibenzyl sulfoxide, ethylvinyl sulfone, alkylphenyl sulfone and 1,3-cyclohexanedione.

Diels-Alder dienophiles suitable in the graft copolymerization process of this invention are known in the art and may be characterized as monomers containing a double or triple bond conjugated with a carbonyl group or a nitrile group such as acrolein, crotonic aldehyde, acrylic acid, crotonitrile, acetylene dicarboxylic esters, quinones and vinyl ethers.")

are hereby incorporated herein by reference.

Specific graftable monomers contemplated for use herein include the following:

N-vinylimidazole;
1-vinyl-2-pyrrolidinone;
C-vinylimidazole;
N-allylimidazole;
1-vinylpyrrolidinone;
2-vinylpyridine;
4-vinylpyridine;
N-methyl-N-vinylacetamide;
diallyl formarmide;
N-methyl-N-allyl formamide;
N-ethyl-N-allyl formamide;
N-cyclohexyl-N-allyl formamide;
4-methyl-5-vinyl thiazole;
N-allyl diisooctyl phenothiazine;
2-methyl-1-vinylimidazole
3-methyl-1-vinylpyrazole
N-vinylpurine
N-vinylpiperazines
N-vinylsuccinimide
Vinylpiperidines
Vinylmorpholines
as well as combinations of those materials or other, similar materials. More broadly, any oxygen- and/or nitrogen-containing ethylenically unsaturated, aliphatic or aromatic monomers having from 2 to about 50 carbon atoms, as well as combinations of such monomers, are contemplated for use as graftable monomers herein.

Initiators

Broadly, any free-radical initiator capable of operating under the conditions of the present reaction is contemplated for use herein. Representative initiators are disclosed in U.S. Pat. No. 4,146,489, col. 4, ll. 45–53, which is incorporated here by reference. Specific peroxycarboxy initiators contemplated herein include alkyl, dialkyl and aryl peroxides, for example:

di-t-butyl peroxide;
dicumyl peroxide;
t-butyl-cumyl peroxide;
t-butyl perbenzoate;
t-amyl perbenzoate;
t-butyl peroxyacetate;
t-butyl peroxybenzoate;
benzoyl peroxide;

di-t-butyl peroxy phthalate;
2,5,-dimethyl-2,5,-di(t-butyl peroxy)hexane;
2,5,-dimethyl-2,5,-di(t-butyl peroxy)hexyne;
and combinations thereof; azo initiators, for example:
butanenitrile,2-methyl,2,2□-azobis;
propanenitrile,2-methyl,2,2□-azobis;
2,2□-azobis(2,4-dimethylpentane nitrile);
1,1□-azobis(cyclohexanecarbonitrile);
azoisobutyronitrile (AIBN);
and combinations thereof; and other similar materials.

Each such initiator commonly has a characteristic minimum reaction initiation temperature, above which it will readily initiate a reaction and below which the reaction will proceed more slowly or not at all. Consequently, the minimum reaction temperature is commonly dictated by the selected initiator.

Solvents

The solvents useful here include volatile solvents which are readily removable from the grafted polyolefin after the reaction is complete. Any solvent may be used which can disperse or dissolve the remaining components of the reaction mixture and which will not participate appreciably in the reaction or cause side reactions to a material degree. Several examples of solvents of this type include straight chain or branched aliphatic or alicyclic hydrocarbons, such as n-pentane, n-heptane, i-heptane, n-octane, i-octane, nonane, decane, cyclohexane, dihydronaphthalene, decahydronaphthalene (sold, for example, under the trademark DECALIN by E. I. Du Pont de Nemours & Co., Wilmington, Del.) and others. Aliphatic ketones (for example, acetone), ethers, esters, etc., and mixtures thereof are also contemplated as solvents herein. Nonreactive halogenated aromatic hydrocarbons such as chlorobenzene, dichlorobenzene, dichlorotoluene and others are also useful as solvents.

The solvents useful here also include base oil stock which has a low aromatic content and which will be suitable for incorporation into a final lubricating oil product. Any base oil may be used which can disperse or dissolve the remaining components of the reaction mixture without materially participating in the reaction or causing side reactions to an unacceptable degree. Specifically, hydrocracked base oils, base oils naturally containing low or moderate levels of aromatic constituents, and fluid poly-α-olefins are contemplated for use herein. Aromatic constituents are desirably kept to low levels (if present at all), since aromatic materials may be reactive with each other or other reaction components in the presence of initiators. The other reaction components thus may either be wasted, or produce unwanted by-products, unless the presence of aromatic constituents is small. The use of base stocks having aromatic constituents, while being less than optimum in some instances, is contemplated under this disclosure.

The level of aromatic constituents in a refined petroleum oil is sometimes expressed as the weight percentage of molecular species containing any proportion of aromatic carbon atoms, and other times is expressed as the weight percentage of only the aromatic carbon atoms. The former value can be much greater than the latter value. In this specification, the "level of aromatic constituents" is defined as the weight percentage of molecular species containing any proportion of aromatic carbon atoms. The petroleum oil solvents contemplated here are those containing less than about 20% by weight of molecular aromatic impurities, alternatively less than about 15% by weight of such impurities, alternatively less than about 9% by weight of such impurities, alternatively less than about 5% by weight of such impurities, alternatively less than about 1% of such impurities, alternatively about 0.2% or less of such impurities.

Examples of suitable solvent base oils are as follows.

The higher aromatic fluids contemplated for the present use have aromatic contents of from about 10 wt % to about 20 wt %. Suitable oils of this kind include Exxon 100 SUS, 130 SUS, or 150 SUS low pour solvent neutral base oils (having only about 3–7% aromatics, based on number of aromatic atoms), sold as lubricating oil base stocks by Exxon Company U.S.A., Houston, Tex.; Mobil 100N solvent refined oil; Texaco Code 6102 solvent neutral oil 100.

The moderately aromatic fluids contemplated for the present use include from about 5% to 10% aromatics. Blends of highly and minimally aromatic fluids, as well as directly-produced moderately aromatic process fluids, are contemplated to be suitable moderately aromatic fluids for practicing the present invention.

The minimally aromatic fluids contemplated for use in the present context include hydrotreated oils having from about 0.1 to about 5 wt % aromatic content. Representative minimally aromatic fluids include PetroCanada HT 60 (P 60 N), HT 70 (P 70 N), HT 100 (P 100 N), and HT 160 (P 160 N) straight cut or blended oil stocks having about 0.2% aromatic constituents, sold for use in lubricating oils by PetroCanada, Calgary, Alberta; and RLOP (derived from "Richmond Lube Oil Plant") 100 N or 240 N straight or blended low aromatic content hydrotreated oil stocks, containing about 0.5% aromatic constituents, sold by Chevron U.S.A Products Co., San Francisco, Calif.

Aromatic-free process fluids can also be used to carry out the present invention. Several examples of process fluids containing no measurable aromatic constituents include synthetic poly-alpha-olefin ("PAO") base stocks such as MOBIL SHF 61, sold by Mobil Oil Co., Fairfax, Va.

The preferable range of aromatic content in the process fluid is about 0–10 wt %. The most preferable range is about 0–5 wt %.

Other solvents with varying amounts of aromatic content contemplated for the present use include the following materials: CHEVRON NEUTRAL OIL 100R, sold by Chevron; HPO-100, HPO-130, HPO-145, and HPO-170 blended and straight cut petroleum hydrocarbon oils containing from about 1–10% aromatics, sold by Sun Refining and Marketing Co., Philadelphia, Pa.; moderately high aromatic content oils such as Exxon naphthenic oil, for which the aromatic content is about 5–12 wt %; blends of any of the individual oils named in this specification; and others.

Inhibitors

Inhibitors may optionally be used in the present grafting reaction to limit the degree of crosslinking of the polyolefin. The inventors contemplate that limiting the amount of crosslinking will reduce the viscosity increase resulting from the grafting reaction and provide a final grafted polyolefin which has improved shear stability.

One category of inhibitors contemplated herein is that of hindered phenols, which are commonly used as antioxidants or free radical inhibitors.

One representative hindered phenol for this purpose is octadecyl 3,5-di-tert-butyl-4-hydroxyhydrocinnamate, which is sold as Irganox 1076 by Ciba-Geigy Corp. Another representative inhibitor is hydroquinone.

Solvent Reaction Conditions

The present reaction can be carried out as follows. The polyolefin to be grafted is provided in fluid form. For example, the polyolefin may be ground and dissolved in a reaction solvent, which may be a base oil for a lubricating composition or another suitable solvent. This step can be carried out under an inert gas blanket, or with an inert gas purge, at a temperature lower than the reaction temperature, typically from 60° C to about 120° C, for example, about 100° C. The mixing temperature will normally be less than the reaction temperature. Holding the mixture at a higher temperature may degrade the components.

The reaction mixture can also be prepared as a melt of the desired polyolefin, with or without any added solvent or plasticizer.

The reaction mixture thus formed is placed in a suitable reactor which can be purged or blanketed with an inert gas (which may be, for example, nitrogen, carbon dioxide, helium, or argon) or otherwise isolated from ambient oxygen gas. A tank reactor may be used or (particularly if the reaction is carried out using a molten polyolefin), an extrusion reactor, extruder, or other high-viscosity-material blender may be used.

The polyolefin solution or melt is heated to the desired reaction temperature. At a minimum, the reaction temperature should be sufficient to consume essentially all of the selected initiator during the time allotted for the reaction. For example, if DTBP (di-t-butyl peroxide) is used as the initiator, the reaction temperature should be greater than about 160° C, alternatively greater than about 165° C, alternatively greater than about 170° C, alternatively greater than about 175° C, alternatively about 170° C, alternatively about 175° C, alternatively less than about 175° C, alternatively less than about 180° C, alternatively less than about 185° C, alternatively less than about 190° C, alter-natively less than about 195° C, alternatively less than about 200° C.

Different initiators work at different rates for a given reaction temperature. Therefore, the choice of a particular initiator may require adjustment of the reaction temperature or time.

The contemplated proportions of the graftable monomer to the polyolefin and reaction conditions are selected so that an effective percentage (ideally, most or all of the molecules) of the graftable monomer will graft directly onto the polyolefin, rather than forming dimeric, oligomeric, or homopolymeric graft moieties or entirely independent homopolymers. At the same time, a high loading of the graftable monomer onto the polymeric backbone is contemplated. The alternatively contemplated minimum mole ratios of the graftable monomer to the starting polyolefin are as follows:

at least about 13 moles,
alternatively at least about 14 moles,
alternatively at least about 15 moles,
alternatively at least about 16 moles,
alternatively at least about 17 moles,
alternatively at least about 18 moles,
alternatively at least about 19 moles,
alternatively at least about 20 moles,
alternatively at least about 22 moles,
alternatively at least about 24 moles,
alternatively at least about 26 moles,
alternatively at least about 28 moles,
alternatively at least about 30 moles,
alternatively at least about 40 moles,
alternatively at least about 50 moles,
alternatively at least about 60 moles,
alternatively at least about 70 moles,
alternatively at least about 80 moles,
alternatively at least about 100 moles,
of the graftable monomer per mole of the starting polyolefin. The contemplated maximum molar proportions of the graftable monomer to the starting polyolefin are as follows:

at most about 20 moles,
alternatively at most about 22 moles,
alternatively at most about 24 moles,
alternatively at most about 26 moles,
alternatively at most about 28 moles,
alternatively at most about 30 moles,
alternatively at most about 40 moles,
alternatively at most about 50 moles,
alternatively at most about 60 moles,
alternatively at most about 70 moles,
alternatively at most about 80 moles,
alternatively at most about 100 moles,
alternatively at most about 110 moles,
alternatively at most about 120 moles,
or more of the graftable monomer per mole of the starting polyolefin.

The graftable monomer may be introduced into the reactor all at once, in several discrete charges, or at a steady rate over an extended period. The desired minimum rate of addition of the graftable monomer to the reaction mixture is selected from:

at least about 0.1%,
alternatively at least about 0.5%,
alternatively at least about 1%,
alternatively at least about 1.2%,
alternatively at least about 1.4%,
alternatively at least about 1.6%,
alternatively at least about 1.8%,
alternatively at least about 2%,
alternatively at least about 2.2%,
alternatively at least about 2.4%,
alternatively at least about 2.6%,
alternatively at least about 2.8%,
alternatively at least about 3%,
alternatively at least about 3.2%,
alternatively at least about 3.4%,
alternatively at least about 3.6%,
alternatively at least about 3.8%,
alternatively at least about 4.0%,
alternatively at least about 4.5%,
alternatively at least about 5%,
alternatively at least about 20%,
of the necessary charge of graftable monomer per minute. The monomer can be added at an essentially constant rate, or at a rate which varies with time. Any of the above values can represent an average rate of addition or the minimum value of a rate which varies with time.

The desired maximum rate of addition is selected from:
at most about 0.1%,
alternatively at most about 0.5%,
alternatively at most about 1%,
alternatively at most about 1.2%,
alternatively at most about 1.4%,
alternatively at most about 1.6%,
alternatively at most about 1.8%,
alternatively at most about 2%,
alternatively at most about 2.2%,
alternatively at most about 2.4%,
alternatively at most about 2.6%,
alternatively at most about 2.8%,
alternatively at most about 3%,
alternatively at most about 3.2%,
alternatively at most about 3.4%,
alternatively at most about 3.6%,
alternatively at most about 3.8%,
alternatively at most about 4.0%,
alternatively at most about 4.5%, alternatively at most about 5%,
alternatively at most about 20%,
alternatively at most about 100%
of the necessary charge of graftable monomer per minute. Any of the above values can represent an average rate of addition or the maximum value of a rate which varies with time. The graftable monomer may be added neat, in solid or molten form, or cut back with a solvent.

The contemplated proportions of the initiator to the graftable monomer and the reaction conditions are selected so that at least many and ideally all of the molecules of the monomer will graft directly onto the polyolefin, rather than forming dimeric, oligomeric, or homopolymeric graft moieties or entirely independent homopolymers. The contemplated minimum molar proportions of the initiator to the graftable monomer are from about 0.05:1 to about 1:1. No specific maximum proportion of the initiator is contemplated, though too much of the initiator may degrade the polyolefin or cause other problems in the finished formulation, would be uneconomical, and should be avoided for these reasons.

The initiator can be added before, with or after the graftable monomer, so the amount of unreacted initiator which is present at any given time is much less than the entire charge, and preferably a small fraction of the entire charge. In one embodiment, the initiator may be added after all the graftable monomer has been added, so there is a large excess of both the graftable monomer and the polyolefin present during essentially the entire reaction. In another embodiment, the initiator may be added along with the graftable monomer, either at the same rate (measured as a percentage of the entire charge added per minute) or at a somewhat faster or slower rate, so there is a large excess of the polyolefin to unreacted initiator, but so the amount of the unreacted graftable monomer is comparable to the amount of unreacted initiator at any given time during the addition.

The initiator may be introduced into the reactor in several (or, alternatively, many) discrete charges, or at a steady rate over an extended period. The desired minimum rate of addition of the initiator to the reaction mixture is selected from:
at least about 0.1%,
alternatively at least about 0.5%,
alternatively at least about 1%,
alternatively at least about 1.2%,
alternatively at least about 1.4%,
alternatively at least about 1.6%,
alternatively at least about 1.8%,
alternatively at least about 2%,
alternatively at least about 2.2%,
alternatively at least about 2.4%,
alternatively at least about 2.6%,
alternatively at least about 2.8%,
alternatively at least about 3%,
alternatively at least about 3.2%,
alternatively at least about 3.4%,
alternatively at least about 3.6%,
alternatively at least about 3.8%,
alternatively at least about 4.0%,
alternatively at least about 4.5%,
alternatively at least about 5%,
alternatively at least about 20%
of the necessary charge of initiator per minute. The initiator can be added at an essentially constant rate, or at a rate which varies with time. Any of the above values can represent an average rate of addition or the minimum value of a rate which varies with time.

The desired maximum rate of addition of the initiator to the reaction mixture is selected from:
at most about 0.1%,
alternatively at most about 0.5%,
alternatively at most about 1%,
alternatively at most about 1.2%,
alternatively at most about 1.4%,
alternatively at most about 1.6%,
alternatively at most about 1.8%,
alternatively at most about 2%,
alternatively at most about 2.2%,
alternatively at most about 2.4%,
alternatively at most about 2.6%,
alternatively at most about 2.8%,
alternatively at most about 3%,
alternatively at most about 3.2%,
alternatively at most about 3.4%,
alternatively at most about 3.6%,
alternatively at most about 3.8%,
alternatively at most about 4.0%,
alternatively at most about 4.5%,
alternatively at most about 5%,
alternatively at most about 10%,
alternatively at most about 20%,
alternatively at most about 40%
of the necessary charge of initiator per minute. Any of the above values can represent an average rate of addition or the maximum value of a rate which varies with time.

While the initiator can be added neat, it is preferably cut back with a solvent to avoid high localized proportions of the initiator as it enters the reactor. In a preferred embodiment, it is substantially diluted with the reaction solvent. The initiator can be diluted by at least about 5 times, alternatively at least about 10 times, alternatively at least about 20 times its weight or volume with a suitable solvent or dispersing medium.

If a polymerization inhibitor is to be used, the inventors contemplate that it may be added after the other ingredients have been added. The inhibitor may constitute from 0 to about 1 weight percent of the reaction mixture, alternatively from about. 0.01 to about 0.5 weight percent of the reaction mixture, alternatively. 0.05 to 0.10 weight percent of the reaction mixture. It may be added immediately after the other reactants or after a time delay. The inhibitor may be added all at once or over a time interval.

After the reactants and the inhibitor (if any) have been added, the reaction mixture is preferably mixed with heating for an additional 2–120 minutes to complete the reaction. The time required for completion of the reaction can be determined by experiment, by determining when the proportion of nitrogen, or of the grafted monomer in solution, reaches a value at or approaching a minimum pre-established value, or when the viscosity approaches a near constant value.

After the reaction has gone essentially to completion, the heat can be removed and the reaction product can be allowed to cool in the reactor with mixing. Alternatively, more aggressive cooling can be employed, using a heat exchanger or other apparatus. Alternatively, the reaction product may be removed while still at or near reaction temperature.

Melt Reaction Conditions

The present reaction can alternatively be carried out by providing a melted reactant composition in an extruder or other polymeric mixer, for example, a Banbury mill. The melt reaction can be carried out as follows.

The contemplated proportions of the graftable monomer to the polyolefin and reaction conditions are selected so that an effective percentage or most or all of the molecules of the graftable monomer will graft directly onto the polyolefin, rather than forming dimeric, oligomeric, or homopolymeric graft moieties or entirely independent homopolymers. At the same time, a high loading of the graftable monomer onto the polymeric backbone is contemplated. The alternatively contemplated minimum molar proportions of the graftable monomer to the starting polyolefin are essentially as previously stated for the solvent reaction.

The reaction mixture is placed in a suitable polyolefin extruder or other mixer for melt-blending high-viscosity compositions. (Where an extruder is referred to in this disclosure, it should be understood that this is exemplary of the broader class of mixers which may be used for melt-blending according to the present invention.) The extruder can be maintained under essentially anaerobic conditions, or can be purged or blanketed with an inert gas (which may be, for example, nitrogen, carbon dioxide, helium, or argon). The extruder can be operated with a screw design and size, barrel diameter and length, die configuration and open cross-section, barrel temperature, die temperature, screw speed, pre-extrusion and post-extrusion conditions, and reactant addition ports designed to provide the appropriate residence times and reaction temperature for the particular initiator, graftable monomer, polyolefin, and inhibitor (if any) selected for use in the extrusion reaction.

The reaction mixture can be heated to the desired reaction temperature before, while, or after the other reactants are added. The necessary heat can be applied from an external source preceding or following the extruder, by friction resulting from mastication and flow of the polyolefin composition in the extruder, by heating the extruder, by providing a suitable exothermic reaction, or by any combination of these expedients. At a minimum, the reaction temperature should be sufficient to consume essentially all of the selected initiator during the time allotted for the reaction.

The graftable monomer may be introduced into the extruder all at once, in several discrete charges, or at a steady rate over an extended period. The desired minimum rate of addition of the graftable monomer to the reaction mixture is essentially as previously stated for the solvent reaction.

The initiator can be added before, with, or after the graftable monomer, so the amount of unreacted initiator which is present at any given time is much less than the entire charge, and preferably a small fraction of the entire charge. In one embodiment, the initiator may be added after all the graftable monomer has been added, so there is a large excess of both the graftable monomer and the polyolefin present during substantially the entire reaction. In another embodiment, the initiator may be added along with the graftable monomer, either at the same rate (measured as a percentage of the entire charge added per minute) or at a somewhat faster or slower rate, so there is a large excess of the polyolefin to unreacted initiator, but so the amount of the unreacted graftable monomer is comparable to the amount of unreacted initiator at any given time during the addition.

The initiator may be introduced into the reactor in several (or, alternatively, many) discrete charges, or at a steady rate over an extended period. The desired rates of addition of the initiator to the reaction mixture are essentially as previously stated for the solvent reaction. While the initiator can be added neat, it is preferably cut back with a solvent to avoid high localized proportions of the initiator as it enters the reactor. Representative solvents include a base oil conventionally used in a lubricant composition, as defined elsewhere in this specification, mineral oil, and other solvents known to those skilled in the art. The solvent may be used at a relatively low level of addition of the overall reaction composition, such as about 2 parts by weight of solvent per hundred parts by weight of resin, i.e., 2 phr. The cut back solvent can be used in essentially the same proportions, respecting the amount of initiator, as previously stated for the solvent reaction.

The extruder may be operated continuously or in a batch process, but it is especially well adapted for continuous operation in which all ingredients are added at a uniform rate. Delays can optionally be provided between the introductions of different ingredients by injecting the ingredients into different parts of the extruder barrel. The monomer, initiator, and optionally a cutback dispersing medium can be introduced together, in an alternate embodiment of the invention.

The reaction residence time and temperature, during and after addition of each ingredient, can be varied to provide a final product having the desired ADT and other properties.

Grafted Polyolefin Test Methods

% Nitrogen

This test is used to determine the proportions of nitrogen on the grafted polyolefin and on the process fluid (assuming the reaction is carried out in a process solvent). The results of this test are used to determine the degree of grafting.

In order to accurately determine the amount of nitrogen grafted onto the two components in the grafted dispersant polyolefin reaction mixture (which is a mixture of the grafted polyolefin and process fluid from the grafting reaction), each component of the reaction mixture must be isolated and then individually analyzed, which can be done on an ANTEK Elemental Analyzer.

Prior to analysis, the reaction mixture must be separated into its individual components—the grafted polyolefin and process fluid. This is accomplished as follows.

Sufficient reaction mixture to contain between 0.1 and 0.15 grams of the grafted polyolefin is placed in a suitable glass vial. Sufficient heptane is added to give a resulting solution containing approximately 2% polyolefin solids.

The grafted polyolefin is precipitated from this solution by slowly adding the solution to a beaker containing an excess of acetone. The precipitate is collected and rinsed several times with acetone. Then this precipitate is placed on a watch glass and dried at 60□ C in an oven for about 18 hours. This precipitate is referred to below as the "extracted polyolefin."

Next, the process fluid or solvent in which the grafting reaction took place is separated from the acetone and heptane, which are discarded.

The extracted polyolefin and process fluid samples are then analyzed separately on the ANTEK Elemental Analyzer (Model 7000 NS) without any further treatment. The total sample response is recorded and the sample area integration is derived from the responses using the Peak Summary Software in the PE Nelson Chromatography software package. The instrument is then calibrated with a suitable standard such as KEMAMIDE (CAS #112-84-5). The calibration is then utilized to convert the sample area integration (i.e. instrument response), referred to above, into the percentage of nitrogen.

Because the "extracted polyolefin" sample contains some process fluid (this commonly ranges between 5% and 30% by weight), the percentage of the process fluid entrapped in the grafted polyolefin must be accurately determined by integrating the process fluid peak in its corresponding GPC chromatogram. This data is then combined with the data from ANTEK Elemental Analyzer to determine what percentage of VIMA (or other nitrogenous monomers) was grafted onto the polyolefin and what percentage was grafted to the process fluid.

The percentage of nitrogen on the polyolefin can be easily converted to the percentage of grafted N-vinylimidazole (VIMA) on the polyolefin by dividing by 0.2976 (since VIMA contains 29.76% nitrogen by weight). A similar computation can be used to find the percentage of any other nitrogenous monomer which has been grafted onto the polyolefin.

Determination of Unreacted Graftable Monomer in Dispersant Polyolefin

The amount of residual unreacted graftable monomer, such as N-vinylimidazole (VIMA), in a dispersant polyolefin is quantified by this method. The peak area ratio of graftable monomer compared to an internal standard, such as n-decane, is determined by Gas Chromatography (GC). The area ratio is converted to a weight ratio by a calibration line. By knowing the amount of the internal standard, it is possible to calculate the weight, and hence the weight fraction, of the free graftable monomer in the dispersant polyolefin.

To carry out the test, a gas chromatograph equipped with a flame ionization detector (FID) and a wide bore capillary attachment such as a Perkin Elmer 8500 or equivalent instrument is suitable. The GC column can be a megabore capillary column such as a DB-5 column [(5%-phenyl) methylpolysiloxane, from J&W Scientific (cat # 125-5032)]. The specifications of this column are: 30 m long, 0.53 mm inside diameter ("ID"), 1.5 $\mu$m film thickness. Other equivalent equipment which would be suitable is well known to a person skilled in the art.

The calibration line is established by injecting several samples having known weight ratios of graftable monomer to internal standard into the GC. The areas under the peaks of graftable monomer and internal standard shown in the chromatograms are integrated. The area ratios of graftable monomer to internal standard versus the weight ratios of graftable monomer to internal standard for the calibration samples—the calibration line—is then plotted. The plot will be a straight line passing through the origin. The slope of the line is then calculated and used for the calculation. The slope was found to be 0.629 for the N-vinylimidazole/n-decane pair according to the equipment and GC conditions employed.

The dispersant polyolefin is diluted with a suitable solvent, such as toluene, containing the internal standard and subsequently analyzed by GC. Prior to analysis, the GC column must be conditioned at 250° C. for 18 hours with a carrier gas (helium) flowing at the rate of 5 ml/min. The samples are injected into the injection port of the GC employed. The peak areas are integrated and the weight and weight fraction of free graftable monomer are calculated as discussed above. The above procedure is known to a person skilled in the art.

ADT Procedure

The ADT test is a test method developed by The Rohm & Haas Co., Philadelphia, Pa., and described in U.S. Pat. No. 4,146,489. The ADT test is used to determine the dispersancy of grafted dispersant polyolefins.

In summary, as described, the ADT test is carried out as follows: A sample of the grafted polyolefin is dissolved in Exxon 130N base oil to give a solution containing 0.25% weight of polyolefin solids. Separately, 10 ml of Exxon 130N base oil is put into each of a series of six test tubes in a test tube rack. 10 ml of the grafted dispersant polyolefin solution is then added to the base oil in the first test tube in the series. The base oil and grafted dispersant polyolefin solution in the first test tube are mixed until homogeneous, giving a solution which contains one half of the concentration of grafted dispersant polyolefin contained in the original solution. From this first tube, 10 ml are decanted and poured into the second tube. The contents of the second tube are further diluted by a factor of 2. This process of sequential dilution is continued through the series of tubes, successively producing solutions with ¼, ⅛, 1/16, and 1/32 of the concentration of grafted dispersant polyolefin contained in the first tube.

A standardized quantity of sludge solution (as described in U.S. Pat. No. 4,146,489), simulating the sludge in the crankcase of an internal combustion engine, is introduced and mixed well in each of the above prepared solutions. The tubes are allowed to stand at room temperature for 24 hours (or, in some cases, for a shorter or longer period, as indicated in the test results). The tubes of each set are examined in front of a light source to determine which tube is the first in the series to exhibit sediment (fallout), this being associated with sludge which is not successfully dispersed. The ADT result is graded as follows:

| # OF TUBES WITH NO SEDIMENT | FIRST FALLOUT PRESENT IN TUBE # | REPORTED ADT RESULT |
|---|---|---|
| 0 | 1 | FAIL |
| 1 | 2 | 1 |
| 2 | 3 | 2 |
| 3 | 4 | 4 |
| 4 | 5 | 8 |
| 5 | 6 | 16 |
| 6 | — | 32 |

The ADT result is reported to the nearest power of two because the on of the grafted dispersant polyolefin solution is halved in each tube.

Rapid ADT Procedure

The rapid ADT test is an accelerated version of the ADT test method describe above. The test is carried out as described for the 24-hour test, except that the test tubes are initially kept in an oven for 90 minutes at 60☐ C. The tubes are graded in the same manner as before to determine the rapid ADT value of the grafted dispersant polyolefin solution. After this accelerated test, the tubes can be maintained for an additional 24 and 48 hours at room temperature to record longer-term results.

UV/RI Ratio

The materials needed include a grafted dispersant polyolefin sample to be tested, unstabilized tetrahydrofuran (THF), glass vials with screw caps, autosampler vials with TEFLON☐ septa and open-top screw caps, an autosampler (if available), a shaker, and disposable pipettes. The equipment used includes a THF reservoir, THF waste containers, a Knauer HPLC Pump 64, a Hitachi 655A-40 Autosampler, two 20 ☐m particle size Phenogel gel permeation chromatographic (GPC) columns (pore sizes $10^5$ ☐ and $10^3$ ☐) from Phenomenex, a 20 ☐m particle size Phenogel GPC guard column (pore size $10^5$ ☐) from Phenomenex, a Spectroflow 757 Absorbance Detector, a Millipore☐ Waters Differential Refractometer R40, a PE Nelson 900 Series Interface, and a Digital 386 Computer with PE Nelson chromatography software.

First, a solution containing a 0.3%-grafted dispersant polyolefin is prepared in unstabilized THF. At the same time, a solution containing 0.3% solids of an appropriate standard is prepared.

The solutions are transferred to vials and sealed using the open-top screw caps and septa. The vials may be arranged on an autosampler, taking note of their sequence.

The flow on the pump is set to 1.2 ml/min. The UV detector is turned on and its wavelength is set to 226 nm. The RI (refractive index) detector is turned on, and its reference cell is flushed with THF for at least ten minutes. Convenient run times are chosen on the computer and/or the autosampler, the analysis is started and the appropriate times are set. The autosampler is then started to begin the analysis. The same procedure is followed to analyze the standard.

Next, the test results are analyzed. The chromatogram contains peaks associated with the polyolefins and the process fluid. The first peak corresponds to the two polyolefins; either grafted polyolefin or standard. After the elution of the polyolefin peak the chromatogram should return to at least near baseline before the process fluid peak begins to elute.

It is important to make sure that the beginning and end times of the standard and sample polyolefin peak are similar. Divide the UV area by the RI area of each sample and the standard to obtain a UV/RI ratio. Divide the UV/RI ratio of the sample by the UV/RI ratio of the standard to obtain a relative UV/R ratio.

Determination of Aromatic Content of Solvent

The aromatic content of the solvent or process fluid used in the grafting reactions is determined by measuring its absorbance over wavelengths ranging from 190 nm to 360 nm in a solution of known concentration. A small amount of the test sample is dissolved in cyclohexane (spectroscopic grade) and the spectrum of the test solution is scanned over the above wavelength range. Measurements are carried out at the peak maxima over the ranges of 190–210 nm, 220–240 nm, and 260–280 nm. These positions correspond to the strongest absorption of mono-, di-, and polycyclic aromatics. Usually the maxima are located at 203 nm, 226 nm, and 270 nm.

The absorbances at these positions, corrected for the baseline absorbances of the corresponding cell at the corresponding wavelength, are used to calculate the concentrations of mono-, di-, and polycyclic aromatics. The aromatics total is the sum of the concentrations of these three aromatic species. In carrying out these calculations, the molar absorptivities of the sample determined at the three specified wavelength ranges are utilized.

Lubricating Oil Compositions

The lubricating oil compositions of the present invention preferably comprise the following ingredients in the stated proportions:

A. from about 70% to about 96% by weight, alternatively from about 80% to about 95% by weight, alternatively from about 88% to about 93% by weight, of one or more base oils (including any process fluid carried over from the process for making the grafted polyolefins);

B. from about 0.25% solids to about 2% solids by weight, alternatively from about 0.5% solids to about 1.5% solids by weight, alternatively from about 0.8% solids to about 1.2% solids by weight, alternatively from 0.25% solids by weight to 1.2% solids by weight, alternatively from 0.8% solids by weight to 1.5% solids by weight, of one or more of the grafted polyolefins made according to this specification (excluding any process oil carried over from the process for making the grafted polyolefins);

C. from about 0.05% solids to 1.0% solids by weight, alternatively from about 0.05% solids to about 0.7% solids by weight, alternatively from about 0.1% solids to about 0.7% solids by weight, of one or more polyolefins other than the grafted polyolefins according to the present invention;

D. from 0 to about 15% by weight, alternatively from about 0.5% to about 10% by weight, alternatively from about 0.5% to about 6% by weight, or alternatively from about 0.7% to about 6%, of one or more dispersants which are not grafted polyolefins according to the present invention;

E. from about 0.3% to 4% by weight, alternatively from about 0.5% to about 3% by weight, alternatively from about 0.5 to about 2% by weight, of one or more detergents;

F. from about 0.01% to 3% by weight, alternatively from about 0.04% to about 2.5% by weight, alternatively from about 0.06% to about 2% by weight, of one or more anti-wear agents;

G. from about 0.01% to 2% by weight, alternatively from about 0.05% to about 1.5% by weight, alternatively from about 0.1% to about 1% by weight, of one or more anti-oxidants; and H. from about 0.0% to 1% by weight, alternatively from about 0.005% to about 0.8% by weight, alternatively from about 0.005% to about 0.5% by weight, of minor ingredients.

The function and properties of each ingredient identified above and several examples of ingredients are specified in the following sections of this specification.

Base Oils

Any of the petroleum or synthetic base oils previously identified as process solvents for the graftable polyolefins of the present invention can be used as the base oil. Any other conventional lubricating oils can be used instead.

Grafted Polyolefins

The grafted polyolefins according to the present invention contain:

at least about 13 moles,
alternatively at least about 14 moles,
alternatively at least about 15 moles,
alternatively at least about 16 moles,
alternatively at least about 17 moles,
alternatively at least about 18 moles,
alternatively at least about 19 moles,
alternatively at least about 20 moles,
alternatively at least about 22 moles,
alternatively at least about 24 moles,
alternatively at least about 26 moles,
alternatively at least about 28 moles,
alternatively at least about 30 moles,
alternatively at least about 32 moles,
alternatively at least about 34 moles,
alternatively at least about 36 moles,
alternatively at least about 38 moles,
alternatively at least about 40 moles,
alternatively at least about 50 moles,
alternatively at least about 60 moles,
alternatively at least about 70 moles,
alternatively at least about 80 moles,
alternatively at least about 90 moles,
alternatively at least about 100 moles,
alternatively at least about 120 moles
of grafted monomer per mole of the original polyolefin, and
at least about 1.2% by weight,
alternatively at least about 1.3% by weight,
alternatively at least about 1.4% by weight,
alternatively at least about 1.5% by weight,
alternatively at least about 1.6% by weight,
alternatively at least about 1.7% by weight,
alternatively at least about 1.8% by weight,
alternatively at least about 1.9% by weight, alternatively at least about 2% by weight,
alternatively at least about 3% by weight,
alternatively at least about 4% by weight,
alternatively at least about 5% by weight,
alternatively at least about 6% by weight,
alternatively at least about 7% by weight,
alternatively at least about 8% by weight,
alternatively at least about 9% by weight,
alternatively at least about 10% by weight,
of grafted moieties per unit weight of the grafted polyolefin.

The molecular weight of the grafted polyolefin is comparable to that of the ungrafted polyolefin from which it is made.

The grafted polyolefins can be used in place of part or all of the viscosity index improving polyolefins conventionally used in such formulations. They can also be used in place of part or all of the dispersants conventionally used in such formulations, as they help keep in suspension the impurities which develop in lubricating oils during use.

The use of the present highly-grafted dispersant polyolefins has many significant formulation advantages. The low-temperature viscosity increase normally caused by the presence of conventional dispersants is largely eliminated. This allows higher-viscosity (thus less expensive and less-volatile) base oils to be used. Another advantage of the present invention is that the highly grafted polyolefin is much less expensive than the conventional dispersants. This means that the formulations of the present invention are more economical than prior formulations which use less-grafted polyolefins and more of the conventional dispersants.

Moreover, an improvement in wear is achieved when the present invention is used and the amount of the conventional dispersant is reduced. The present inventors believe that the anti-wear ingredients used in the formulations of Examples 18 and 19 are better able to function when little of the dispersant is present. Dispersants interact with the anti-wear agents and compete with them for sites on the parts being lubricated, thus reducing their effectiveness. Without intending to be bound by the accuracy of this theory, the inventors theorize that the zinc in the anti-wear agents is substituted by another metal in the composition (such as copper), and that the zinc is then free to form complexes with the dispersant. The inventors further theorize that this interaction reduces the efficacy of the anti-wear agents. *See Exxon Chemical Patents, Inc. v. Lubrizol Corporation*, Docket No. 93-1275 (Fed. Cir. Sep. 1, 1995) (slip op. at 12–13). That opinion is incorporated here by reference.

In addition, because of the smaller viscosity increase it imparts to lubricating oil, a relatively larger amount of the grafted polyolefin can be incorporated in a base oil having a high initial viscosity and consequently low volatility. The resulting lubricating oil composition can be formulated to a desired viscosity specification (e.g. 10W-30) with reduced volatility.

Another formulation advantage is that the amount of a separate dispersant can be reduced, making room for more of the grafted polyolefin, more base oil, or both.

The grafted polyolefins of the prior art can also be used herein in combination with the grafted polyolefins according to the present invention. Previously known grafted polyolefins, some of which also may displace part of other dispersing agents, include those disclosed in U.S. Pat. No. 4,092,255, col. 1, ll. 47–53: grafted polyolefins resulting from the grafting of acrylonitrile or aminoalkyl methacrylates on amorphous polyolefins of ethylene and propylene, or also polyolefins obtained by radical polymerization of acrylates or alkyl methacrylates with vinyllactams such as N-vinylpyrrolidinone or aminoalkyl methacrylates.

Other grafted polyolefins useful herein include those disclosed in U.S. Pat. No. 4,092,255 from col. 2, l. 1, to col. 5, l. 12, which is hereby incorporated herein by reference. The constituents of those grafted polyolefins (polyolefins, initiators, and graftable monomers) can also be used to prepare the grafted polyolefins according to the present invention.

Non-Grafted Polyolefins

Any of the conventional viscosity index improving polyolefins can be used in the formulations according to the present invention. These are conventionally long-chain polyolefins. Several examples of polyolefins contemplated for use herein include those suggested by U.S. Pat. No. 4,092,255, col. 1, l. 29–32: polyisobutene, polymethacrylates, polyalkylstyrenes, partially hydrogenated copolymers of butadiene and styrene, and amorphous polyolefins of ethylene and propylene.

Other Dispersants

Other dispersants (i.e. dispersants which are not the graft copolymers described previously) also maintain oil insolubles, resulting from oxidation which occurs in a lubricated engine in use, in suspension in the fluid, thus preventing sludge flocculation and precipitation or deposition of particulates on metal parts. Suitable dispersants include high molecular weight alkyl succinimides and the reaction products of oil-soluble polyisobutylene succinic anhydride with ethylene amines such as tetraethylene pentamine and borated salts thereof.

Such conventional dispersants are also contemplated for use herein, although frequently they can be used in a reduced quantity when the grafted polyolefins according to the present invention are also used. Several examples of dispersants include those listed in U.S. Pat. No. 4,092,255, col. 1, ll. 38–41: succinimides or succinic esters, alkylated with a polyolefin of isobutene or propylene, on the carbon in the alpha position of the succinimide carbonyl. These additives are useful for maintaining the cleanliness of an engine or other machinery.

Detergents

Detergents and rust inhibitors can be used in the present lubricating oil compositions. These materials include the metal salts of sulfonic acids, alkyl phenols, sulfurized alkyl phenols, alkyl salicylates, naphthenates, and other soluble mono- and dicarboxylic acids. Highly basic (vis, overbased) metal salts, such as highly basic alkaline earth metal sulfonates (especially calcium and magnesium salts) are frequently used as detergents. Such detergents are particularly useful for keeping the insoluble particulate materials in an engine or other machinery in suspension. Other examples of detergents contemplated for use herein include those recited in U.S. Pat. No. 4,092,255, col. 1, ll. 35–36: sulfonates, phenates, or organic phosphates of polyvalent metals.

Anti-Wear Agents

Anti-wear agents, as their name implies, reduce wear of metal parts. Zinc dialkyldithiophosphate and zinc diaryldithiophosphate are representative of conventional anti-wear agents.

Anti-Oxidants

Oxidation inhibitors, or anti-oxidants, reduce the tendency of mineral oils to deteriorate in service. This deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, dioctylphenylamine, phenyl-alpha-naphthylamine, phosphosulfurized or sulfurized hydrocarbons, etc.

Pour Point Depressants

Pour point depressants, otherwise known as lube oil flow improvers, lower the temperature at which the fluid will flow or can be poured. Such additives are well known. Typical of those additives which optimize the low temperature fluidity of a lubricant are $C_8$–$C_{18}$ dialkylfumarate vinyl acetate copolymers, polymethacrylates, and wax naphthalene.

Minor Ingredients

Many minor ingredients which do not prevent the use of the present compositions as lubricating oils are contemplated herein. A non-exhaustive list of other such additives includes rust inhibitors, as well as extreme pressure additives, friction modifiers, antifoam additives, and dyes.

WORKING EXAMPLES

Example 1
Laboratory Preparation of Grafted Polyolefin 500 g of a polyolefin solution consisting of 12.50 weight % DuPont ORTHOLEUM 2053 in Petrocanada 160N base oil were placed in a resin kettle. This solution was heated with an electric heating mantle to 190° C.

During heating the solution was purged with an inert gas ($CO_2$) fed below the surface of the polyolefin solution. When the solution reached 190° C. the $CO_2$ purge was diverted to flow over the surface at a rate of 80 ml/min.

With the polyolefin solution at 190° C., 1.00% by weight of n-vinylimidazole (by weight of the polyolefin solution) was added over a one minute period. After thoroughly mixing the graftable monomer with the polyolefin solution (about 2 minutes), 0.20% initiator (DTBP) by weight of the polyolefin solution was added over a thirty-minute period. The resulting reaction mixture was allowed to mix with heating for an additional sixty minutes after the thirty-minute initiator addition.

These reaction conditions and properties of the resulting reaction products are given in Table 1.

Example 2
Laboratory Preparation of Grafted Polyolefin

The grafting reaction was carried out in the same manner as in Example 1, with the following changes. The weight of polyolefin solution was increased from 500 g to 1600 g.

Example 3
Laboratory Preparation of Grafted Polyolefin

The grafting reaction was carried out in the same manner as in Example 1, with the following changes. The reaction temperature was reduced to 170° C. The addition times of the graftable monomer and initiator were increased to sixty minutes. The reaction time after the graftable monomer and initiator were added was reduced to thirty minutes.

Example 4
Laboratory Preparation of Grafted Polyolefin

The grafting reaction was carried out in the same manner as in Example 1, with the following changes. The addition times of the graftable monomer and initiator were increased to sixty minutes. The reaction time after the graftable monomer and initiator additions was reduced to thirty minutes.

Example 5
Laboratory Preparation of Grafted Polyolefin

The grafting reaction was carried out in the same manner as in Example 1, with the following changes. The addition times of the graftable monomer and initiator were increased to sixty minutes. The reaction temperature was reduced to 170° C. The amount of the graftable monomer was reduced to 0.70 weight % of the polyolefin solution. The amount of the initiator was reduced to 0.15 weight % of the polyolefin solution. The reaction time after the additions was reduced to thirty minutes.

Example 6
Pilot Plant Preparation of Grafted Polyolefin 30.0 kg of a polyolefin solution was placed in a reactor. The polyolefin solution consisted of 12.50 weight % of DuPont ORTHOLEUM 2053 polyolefin in Petrocanada 160N base oil. This solution was heated with an oil recirculation system to 180° C. During the initial stages of heating, the solution was blanketed with an inert gas ($CO_2$). After 5 minutes, the gas flow was stopped and the reactor sealed.

With the polyolefin solution at 180° C., 1.00% n-vinylimidazole (by weight of the polyolefin solution) was added over a one minute period. After thoroughly mixing the graftable monomer with the polyolefin solution for 20 minutes, 0.20% DTBP initiator (by weight of the polyolefin solution) was added over a thirty-minute period. The resulting reaction mixture was allowed to mix with heating for an additional sixty minutes after the thirty-minute initiator addition.

Example 7
Pilot Plant Preparation of Grafted Polyolefin

The grafting reaction was carried out in the same manner for this example as for Example 6, with the following changes. The reaction temperature was reduced to 170° C. The addition times of the graftable monomer and initiator were increased to sixty minutes. The reaction time after the addition was increased to 180 minutes.

Example 8
Pilot Plant Preparation of Grafted Polyolefin

The grafting reaction was carried out in the same manner as in Example 6, with the following changes. The addition times of the graftable monomer and initiator were increased to sixty minutes. The reaction temperature was reduced to 170° C. The graftable monomer was reduced to 0.70 weight % of the polyolefin solution. The initiator was reduced to 0.15 weight % of the polyolefin solution.

Example 9
Pilot Plant Preparation of Comparative Grafted Polyolefin

The grafting reaction was carried out in the same manner as in Example 6, with the following changes. The graftable monomer was reduced to 0.28 weight % of the polyolefin solution. The initiator was reduced to 0.07 weight % of the polyolefin solution. The reaction temperature was reduced to 170° C.

Example 10
Preparation of Grafted Polyolefin 4430 gallons (14,311 kg) of polyolefin solution, purged with $CO_2$ gas, containing 12.5 wt % Ortholeum 2053 dissolved in Petrocanada 160 N (P160N) base stock, were transferred into a 5600 gallon (21,200 l.) well-stirred reactor. A $CO_2$ gas blanket was maintained in the reactor. The material was heated to 170° C. under the $CO_2$ blanket. At that temperature, the graftable monomer and initiator were fed into the reactor.

For this reaction, 26.2 gallons (103 kg) of graftable monomer, which corresponds to 0.72 wt % of the polyolefin solution, were fed through the top of the reactor at an addition rate of 0.435 gal/min (0.0286 kg/sec, 0.012 wt %/min).

7.34 gallons (22.2 kg) of initiator, which corresponds to 0.155 wt % of the polyolefin solution, were diluted with 137.5 gallons (444 kg, dilution factor 20) of PetroCanada 160 N (P160N) base stock. The diluted initiator was fed via the recirculation (mixer) line through an inlet to the bottom of the reactor at an addition rate of 0.817 pounds/min (0.0062 kg/sec, 0.0026 wt %/min).

The reaction mixture was maintained at about 170° C. throughout the reaction. The mixture was allowed to react for 90 minutes after all the reactants had been introduced. When the reaction was complete, the mixture was transferred to a product holding tank.

Example 11
Preparation of Grafted Polyolefin

The reaction was carried out according to Example 10, with the following change. The post-feed reaction time was reduced from 90 minutes to 15 minutes, after which the reactants were transferred out of the reactor.

Example 12
Preparation of Comparative Grafted Polyolefin

The reaction was carried out according to Example 10, with the following changes. The process fluid was changed to P100N base oil. 9.36 gallons (36.8 kg) of VIMA, corresponding to 0.25 wt % of the polyolefin solution, was introduced into the reactor all at once. Sufficient time (about 20 or 30 minutes) was allowed to permit dispersion of the graftable monomer throughout the reactor. The initiator quantity was reduced from 7.34 gallons (22.2 kg) to 2.83 gallons (8.56 kg). The latter quantity, which corresponds to 0.06 wt % of the polyolefin solution, was diluted with 53.0 gallons (171 kg) of P100N base oil, and was introduced into the reactor over 30 minutes at a uniform rate of 0.63 pounds/min (0.0048 kg/sec, 0.002 wt %/min). The reaction was complete 60 minutes after all of the initiator had been introduced.

Example 13
Alternate Reaction Components

The experiments of Examples 1–12 are repeated, using conditions similar to those of the previous Examples, with each possible combination of the solvents, polyolefins, graftable monomers, and initiators identified earlier in this application. Grafted polyolefins are formed which have utility for increasing the viscosity index of a lubricating oil.

Examples 14–17
Preparation of Lubricating Oil Compositions

To demonstrate the formulation flexibility permitted by the present invention, several SAE 10W-30 lubricant formulations having the ingredients set out in Table 2 were prepared as Examples 14–17. The DI (dispersant/inhibitor) package used in the formulations was similar to a commercial automotive lubrication oil DI package.

Example 14 was a comparative example in which no grafted polyolefin was used and conventional dispersants were employed. In Example 14, the necessary dispersancy was provided by using a total of 6% by weight of conventional dispersants (1% contributed by the dispersant/inhibitor package and 5% added directly). The oil was kept within grade by using a low-viscosity base oil (5 cSt: see the second page of Table 2) and a relatively large amount of a VII polymer solution (exceeding 7 wt %).

Examples 15 and 16 were comparative examples using VIMA-grafted polyolefin solutions falling outside the scope of the present invention. The VIMA grafted polyolefin "A" used in Examples 15 and 16 was a conventional grafted polyolefin with a mole ratio of grafted N-vinylimidazole of about 8–10 moles per mole of polymer and a typical ADT of 4 (Table 2, page 2). This ADT value is outside the scope of the embodiments of the present invention which require an ADT of at least about 8. In Examples 15–16, the polyolefin solids (ungrafted VII polyolefin plus grafted polyolefins) were comparable to those of Example 14, and most of the ungrafted VII polymer and some of the total dispersant were replaced by a VIMA-grafted polyolefin (dispersant polyolefin) containing less VIMA than the present invention requires.

The formulation of Example 17 contained a VIMA grafted polyolefin solution according to the present invention. The VIMA grafted polyolefin "B" used in Example 17 was produced according to this invention and had a mole ratio of about 32 moles of monomer to each mole of polymer and an ADT of 16, which is within the ADT ranges of the present invention. The formulation of Example 17 contains just 25% as much of conventional dispersants as the formulation of Example 14 (see Table 2, second page, "total dispersant").

One advantage of the formulation of Example 17 is that the low-temperature viscosity increase normally caused by the presence of conventional dispersants is largely eliminated. This allows higher-viscosity (thus less-expensive and less-volatile) base oils to be used for blending a 10W-30 formulation.

Another advantage of the present invention, reflected in Example 17, is that the VIMA-grafted polyolefin of that example is much less expensive than conventional dispersants. This means that formulations containing the present invention are more economical than prior formulations which use less-grafted polymers and conventional dispersants.

Examples 18–19
Engine Testing Data

The compositions identified in Table 3 were prepared and engine tested using the ASTM Sequence VE test. The conventional VIMA-grafted polyolefin (solution) used in Example 18 had an ADT of about 4, which is less than the ADT of at least about 8 required by some embodiments of the present invention. The VIMA-grafted polyolefin (solution) used in Example 19 had an ADT of 16, which is within the scope of the grafted polyolefins of the present invention.

The amount of dispersant used in Example 19, according to the present invention, was again 25% that of Example 18 (1 wt. % vs. 4 wt %). Yet, Example 19 provided better dispersancy in the cleanliness/dispersancy test results reported in Table 3. The test results for rocker arm cover sludge, average engine sludge, piston skirt varnish, and average engine varnish, were higher (better) for Example 19, according to the present invention, than for Example 18 which used a less highly grafted polyolefin (dispersant).

The ADT for Example 19 is 16, which is greater than the ADT for Example 18 (which is 4). Therefore, an ADT of 16 and even 8 gives excellent engine performance. Other grafted polyolefins similarly exhibiting ADT values of 16 and also of at least about 8 fall within the scope of this invention and will exhibit excellent engine performance. The inventors contemplate that ADT may be used as a measure of expected dispersant performance instead of $N_2\%$.

Moreover, the wear test results of Table 3 illustrate an improvement in wear when the present invention was used and the amount of the conventional dispersant was reduced. For the average cam wear and maximum cam wear tests of Table 3, a lower number represents less wear and thus a better result.

The inventors believe that the anti-wear ingredients used in the formulations of Examples 18 and 19 are better able to function when little of the dispersant is present. Dispersants can interact with the anti-wear agents and also compete with them for sites on the parts being lubricated, thus reducing their effectiveness.

Table 3 thus illustrates that the use of a high-ADT dispersant polyolefin according to the present invention (which preferably has an ADT value of 8 or more) in place of conventional dispersants provides at least equal or better dispersancy and better anti-wear performance than a lower-ADT dispersant.

Examples 20–46
Preparation of Grafted Polyolefin

Examples 20–46 were carried out similarly to the previous examples. A number of different monomers, either alone or in combinations, were successfully grafted onto a number of different polyolefins of different structure and different chemistry. The conditions and results, in terms of ADT response, of these examples are reported in Table 4.

Nitrogen values and wt % grafted monomer could not be accurately assessed in these examples because the molecular weight and monomer distribution of the polyolefin were unknown in many instances. As noted above, however, grafted products providing ADT results of at least about 8 will perform acceptably in a sequence VE Engine Test. In all these cases, ADT values of 8 or 16 were obtained.

In Examples 20–27, N-vinylimidazole (VIMA) was grafted successfully onto a series of different polyolefins which are identified by the manufacturer and a letter code in Table 4.

In Example 28, 4-vinylpyridine was grafted onto a polyolefin. In Examples 29–34, two monomers, N-vinylimidazole (VIMA) and 4-vinylpyridine ("4VP") were used together. In Examples 29, 31, 32 and 34 the 4VP was introduced first followed by the VIMA. In examples, 30 and 33 both the 4VP and VIMA were introduced simultaneously. In Example 35, 2-vinylpyridine (2VP) was used with N-vinylimidazole (VIMA). The 2VP was added first, followed by the VIMA. In Examples 39, 41, and 43–45, N-methyl-N-vinylacetamide (MVA) was grafted onto several different polyolefins. In Examples 40 and 42 diallylformamide (DAF) was used as a graft monomer with two different polyolefins. In Example 46, N-allylimidazole (AIMA) was successfully used as a graft monomer.

Initiators other than di-t-butyl peroxide ("DTBP") were successfully used in Examples 36 (t-butyl cumyl peroxide); Examples 37, 39, and 44 (dicumyl peroxide); and Examples 38, 41, and 45 (2,5-dimethyl-2,5-di-(t-butyl-peroxy) hexane).

The ADT values for Examples 20–46 were all at least about 8, showing that these grafted polyolefins fall within the scope of the present invention.

Examples 47–49
Preparation of Grafted Polyolefin by Extrusion

A Leistritz 34 mm co-rotating intermeshing screw extruder was used as a reaction vessel to prepare grafted polyolefins in several trial runs, reported in Table 5 as Examples 47–49. For each run, the extruder was fed with DuPont ORTHOLEUM 2053 polyolefin.

For each of Examples 47–49, 2 phr (parts by weight, per 100 parts by weight resin) of mineral oil (generally used as a cutback solvent for the initiator), 0.1 phr of a peroxide initiator (two different initiators were used in these Examples, as Table 5 indicates) and 1.0 phr of N-vinylimidazole as a graft monomer were mixed to form a master-batch, which was added to the extruder to react with the polymer.

Referring to Table 5, in Examples 47–49 the ADT of the product was improved, in each instance, from the nominal ADT of the polyolefin (which is zero). This improvement indicated that grafting had occurred.

In Example 48, an ADT value of 4 was measured. A grafted ethylene/propylene/diene terpolymer having an ADT value of 4 has utility in a motor oil composition as a dispersant viscosity index improver, so this ADT value indicates that the extrusion-grafted copolymer has utility in motor oil compositions. The present inventors believe that with further experimentation the ADT value obtained by extrusion grafting can be raised to a level of at least about 8, and probably to a value of 16 or more.

TABLE 1

| CONDITIONS AND | EXAMPLE | | | | | | | | | | | |
|---|---|---|---|---|---|---|---|---|---|---|---|---|
| RESULTS | 1 | 2 | 3 | 4 | 5 | 6 | 7 | 8 | 9 | 10 | 11 | 12 |
| SOLVENT: | P160N | P160N | P160N | P160N | P160N | P160N | P160N | P160N | P160N | P160N | P160N | P100N |
| POLYOLEFIN: | 2053 | 2053 | 2053 | 2053 | 2053 | 2053 | 2053 | 2053 | 2053 | 2053 | 2053 | 2053 |
| MANUFACTURER: | | | | | | ←DUPONT→ | | | | | | |
| WT %: | 12.5 | 12.5 | 12.5 | 12.5 | 12.5 | 12.5 | 12.5 | 12.5 | 12.5 | 12.5 | 12.5 | 12.5 |
| RXN TEMP (EC): | 190 | 190 | 170 | 190 | 170 | 180 | 170 | 170 | 170 | 170 | 170 | 170 |
| MONOMER: | VIMA | VIMA | VIMA | VIMA | VIMA | VIMA | VIMA | VIMA | VIMA | VIMA | VIMA | VIMA |
| WT %: | 1.0 | 1.0 | 1.0 | 1.0 | 0.7 | 1.0 | 1.0 | 0.7 | 0.28 | 0.7 | 0.7 | 0.25 |
| ADD TIME, MIN.: | 1 | 1 | 60 | 60 | 60 | 1 | 60 | 60 | 1 | 60 | 60 | 0 |
| MONOMER: | — | — | — | — | — | — | — | — | — | — | — | — |
| WT %: | — | — | — | — | — | — | — | — | — | — | — | — |
| ADD TIME, MIN.: | — | — | — | — | — | — | — | — | — | — | — | — |
| INITIATOR: | DTBP | DTBP | DTBP | DTBP | DTBP | DTBP | DTBP | DTBP | DTBP | DTBP | DTBP | DTBP |
| WT %: | 0.20 | 0.20 | 0.20 | 0.20 | 0.15 | 0.20 | 0.20 | 0.15 | 0.07 | 0.16 | 0.16 | 0.06 |
| ADD TIME, MIN.: | 30 | 30 | 60 | 60 | 60 | 30 | 60 | 60 | 30 | 60 | 60 | 30 |
| MIX TIME, MIN.: | 60 | 60 | 30 | 30 | 30 | 60 | 180 | 60 | 60 | 90 | 15 | 60 |
| VIS INCREASE, %: | 267 | 370 | 224 | 192 | 153 | 579 | 454 | 245 | 65 | 246 | 209 | 52 |

TABLE 1-continued

| CONDITIONS AND RESULTS | EXAMPLE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| ADT: | 16 | 8 | 16 | 16 | 16 | 8 | 16 | 16 | 4 | 16 | 16 | 4 |
| N2, %: | 1.53 | 1.54 | 0.78 | 0.55 | 0.37 | 1.78 | 1.02 | 0.59 | 0.18 | 0.89 | 0.96 | 0.22 |
| GRAFT VIMA WT %: | 5.14 | 5.16 | 2.62 | 1.84 | 1.24 | 5.98 | 3.43 | 1.97 | 0.61 | 3.00 | 3.22 | 0.75 |
| GRAFT 4-VP WT %: | — | — | — | — | — | — | — | — | — | — | — | — |
| TOTAL GRAFT, WT %: | 5.14 | 5.16 | 2.62 | 1.84 | 1.24 | 5.98 | 3.43 | 1.97 | 0.61 | 3.00 | 3.22 | 0.75 |
| GRAFT, MOL RATIO: | 57.5 | 57.9 | 28.6 | 19.9 | 13.3 | 67.6 | 37.8 | 21.4 | 6.56 | 32.9 | 35.4 | 8.01 |

TABLE 2

SAE 10W-30 FORMULATIONS

| INGREDIENT (WT. %) | EXAMPLE | | | |
|---|---|---|---|---|
| | 14 | 15 | 16 | 17 |
| TYPE OF EXAMPLE | ←comparative→ | | | invention |
| Lubricant Base Oil: | | | | |
| Exxon 130N | 69.75 | — | — | — |
| Exxon 150N[1] | — | 82.55 | 77.20 | 73.87 |
| Exxon 330N | 12.40 | — | 5.60 | 10.00 |
| DI Package | 5.30 | 5.30 | 5.30 | 5.30 |
| Dispersant | 5.00 | 3.00 | 3.00 | 0.50 |
| Pour Point Depressant: | 0.10 | 0.10 | 0.10 | 0.10 |
| VII Polymer | 7.45 | 2.10 | 1.85 | 0.50 |
| VIMA-Grafted Polyolefins: | | | | |
| A | — | 6.95 | 6.95 | — |
| B | — | — | — | 9.73 |
| Total Weight | 100.0 | 100.0 | 100.0 | 100.0 |
| Total Base Oil | 82.15 | 82.55 | 82.80 | 83.87 |
| Total Dispersant | 6.00 | 4.00 | 4.00 | 1.50 |
| Total Polymer Solids: | 0.976 | 0.985 | 0.95 | 0.937 |
| ADT, VII Polymer | 0 | 0 | 0 | 0 |
| ADT. VIMA-Grafted Polyolefins | 0 | 4 | 4 | 16 |
| N2% (typical): | 0 | 0.22–0.28 | 0.22–0.28 | 0.89 |
| Graft, Wt % (typical): | 0 | 0.75–0.94 | 0.75–0.94 | 3.00 |
| Graft, mol ratio (typical): | 0 | 8–10 | 8–10 | 32 |
| Base Oil Viscosity, cSt | 5.0 | 5.2 | 5.35 | 5.46 |
| Kinematic Vis @ 100EC, cSt | 11.80 | 11.70 | 11.76 | 11.75 |
| CCS @ 20EC, P | 29.30 | 27.50 | 31.30 | 30.90 |
| Ravenfield HT/HS, cP | 3.51 | 3.33 | — | 3.33 |
| Noack, % Wt Loss | 20.15 | 18.68 | 18.20 | 17.20 |

[1]LP

TABLE 3

| INGREDIENT (Wt. %) | EXAMPLE | | Requirement |
|---|---|---|---|
| | 18 | 19 | |
| Engine Test Data | | | |
| Type of Example | (comparative) | (invention) | |
| Base Oil | 78.4 | 82.10 | |
| VII Polyolefin | 7.60 | 2.80 | |
| VIMA-grafted polyolefin solution A | 5.50 | — | |
| VIMA-grafted polyolefin solution B | — | 10.00 | |
| Detergent | 2.70 | 2.40 | |
| Anti-Wear agent | 1.30 | 1.15 | |
| Anti-oxidant | 0.40 | 0.44 | |
| Pour point depressant | 0.10 | 0.10 | |
| Dispersant | 4.00 | 1.00 | |
| Total | 100.0 | 100.0 | |
| ADT, VII Polymer | 0 | 0 | |
| ADT, VIMA-Grafted Polyolefins | 4 | 16 | |
| N2 % | 0.22 | 0.89 | |
| Graft, wt % | 0.75 | 3.00 | |
| Graft, mol ratio | 8.0 | 32.9 | |
| ASTM Sequence VE Test Results | | | |
| Rocker Arm Cover Sludge | 8.01 | 9.14 | ≥7.0 |
| Average Engine Sludge | 8.26 | 9.37 | ≥9.0 |
| Piston Skirt Varnish | 6.78 | 6.89 | ≥6.5 |
| Average Engine Varnish | 5.97 | 6.62 | ≥5.0 |
| Average Cam Wear | 10.59 | 0.16 | ≤5.0 |
| Maximum Cam Wear | 21.4 | 0.20 | ≤15 |

TABLE 4

| CONDITIONS AND RESULTS | EXAMPLE | | | | | | | | | | | | |
|---|---|---|---|---|---|---|---|---|---|---|---|---|---|
| | 20 | 21 | 22 | 23 | 24 | 25 | 26 | 27 | 28 | 29 | 30 | 31 | 32 |
| SOLVENT: | | | | | | | | | | | | | |
| POLYOLEFIN: | P160N (B) | P160N (B) | P160N (C) | P160N (C) | P160N (H) | P100N (D) | P100N (E) | P160N (E) | P160N 2053 | P160N (C) | P160N (C) | P160N 2053 | P160N 2053 |
| MANUFACTURER: | ←Mitsui→ | | ←Lubrizol→ | | Shell | ←DuPont→ | | | DuPont | ←Lubrizol→ | | ←DuPont→ | |
| WT %: | 12.5 | 12.5 | 10.0 | 10.0 | 12.5 | 9.00 | 12.5 | 12.5 | 12.5 | 10.0 | 10.0 | 12.5 | 12.5 |
| RXN TEMP (EC): | 170 | 170 | 170 | 170 | 170 | 190 | 170 | 170 | 170 | 170 | 170 | 170 | 170 |
| MONOMER: | VIMA | VIMA | VIMA | VIMA | VIMA | VIMA | VIMA | VIMA | 4-VP[1] | 4-VP | 4-VP | 4-VP | 4-VP |
| WT %: | 1.0 | 0.8 | 0.5 | 0.5 | 0.8 | 0.60 | 1.00 | 1.00 | 1.00 | 0.20 | 0.20 | 0.35 | 0.40 |
| ADD TIME, MIN.: | 60 | 60 | 60 | 60 | 60 | 1 | 1 | 1 | 60 | <1 | 60[2] | <1 | <1 |
| MONOMER: | — | — | — | — | — | — | — | — | — | VIMA | VIMA | VIMA | VIMA |
| WT %: | — | — | — | — | — | — | — | — | — | 0.5 | 0.5 | 0.35 | 0.40 |
| ADD TIME, MIN.: | — | — | — | — | — | — | — | — | — | 60 | 60[2] | 60 | 60 |
| INITIATOR: | DTBP | DTBP | DTBP | DTBP | DTBP | DTBP | DTBP | DTBP | DTBP | DTBP | DTBP | DTBP | DTBP |
| WT %: | 0.20 | 0.20 | 0.10 | 0.15 | 0.20 | 0.20 | 0.20 | 0.20 | 0.3 | 0.15 | 0.15 | 0.20 | 0.30 |
| ADD TIME, MIN.: | 60 | 60 | 60 | 60 | 60 | 30 | 30 | 30 | 60 | 60 | 60 | 60 | 60 |
| MIX TIME, MIN.: | 30 | 30 | 30 | 30 | 60 | 60 | 60 | 60 | 30 | 30 | 30 | 30 | 30 |
| VIS INCREASE, %: | 22 | 4 | 146 | 172 | 22 | 14 | −24 | 158 | 9 | 49 | 22 | 26 | 157 |
| ADT: | 16 | 16 | 8 | 16 | 16 | 16 | 8 | 8 | 8 | 8 | 8 | 8 | 16 |

[1] 4-VP = 4-vinylpyridine
[2] Both graftable monomers were added during the same time period.

| CONDITIONS AND RESULTS | EXAMPLE | | | | | | | | | |
|---|---|---|---|---|---|---|---|---|---|---|
| | 33 | 34 | 35 | 36 | 37 | 38 | 39 | 40 | 41 | 42 |
| SOLVENT: | | | | | | | | | | |
| POLYOLEFIN: | P160N 2053 | P160N 2053 | P160N 2053 | P160N 2053 | P160N 2053 | P160N 2053 | P160N F | P160N F | P160N G | P160N G |
| MANUFACTURER: | | | | | ←DuPont→ | | | | | |
| WT %: | 12.5 | 12.5 | 12.5 | 12.50 | 12.50 | 12.50 | 12.50 | 12.50 | 12.50 | 12.50 |
| RXN TEMP (EC): | 170 | 170 | 190 | 170 | 170 | 170 | 155 | 170 | 145 | 170 |
| MONOMER: | 4-VP | 4-VP | 2-VP | VIMA | VIMA | VIMA | MVA | DAF | MVA | DAF |
| WT %: | 0.50 | 0.50 | 0.80 | 1.00 | 1.00 | 1.00 | 2.00 | 2.50 | 2.00 | 2.50 |
| ADD TIME, MIN.: | 60[1] | <1 | <1 | 60 | 60 | 60 | 60 | 120 | 60 | 120 |
| MONOMER: | VIMA | VIMA | VIMA | — | — | — | — | — | — | — |
| WT %: | 0.40 | 0.40 | 0.60 | — | — | — | — | — | — | — |
| ADD TIME, MIN.: | 60 | 60 | 60 | — | — | — | — | — | — | — |
| INITIATOR: | DTBP | DTBP | DTBP | TBCP[1] | 500R[2] | LUP-101[3] | 500R | DTBP | LUP-101 | DTBP |
| WT %: | 0.30 | 0.30 | 0.30 | 0.20 | 0.37 | 0.15 | 0.37 | 0.35 | 0.40 | 0.35 |
| ADD TIME, MIN.: | 60[1] | 60 | 60 | 60 | 60 | 60 | 60 | 120 | 60 | 120 |
| MIX TIME, MIN.: | 30 | 30 | 30 | 30 | 30 | 60 | 60 | 120 | 30 | 120 |
| VIS INCREASE, %: | 2 | 153 | 135 | 324 | 265 | 230 | 352 | 862 | 373 | 317 |
| ADT: | 8 | 16 | 8 | 16 | 16 | 16 | 16 | 16 | 8 | 16 |

[1] Both graftable monomers were added during the same time period.
MVA = Methyl vinylacetoxide
DAF = diallyl formamide

| CONDITIONS AND RESULTS | EXAMPLE | | | |
|---|---|---|---|---|
| | 43 | 44 | 45 | 46 |
| SOLVENT: | | | | |
| POLYOLEFIN: | P160N 2053 | P160N 2053 | P160N 2053 | P160N G |
| MANUFACTURER: | | | | ←DuPont→ |
| WT %: | 12.50 | 12.50 | 12.50 | 12.50 |
| RXN TEMP (EC): | 170 | 170 | 156 | 170 |
| MONOMER: | MVA | MVA | MVA | AIMA |
| WT %: | 2.10 | 2.1 | 1.05 | 2 |
| ADD TIME, MIN.: | 60 | 60 | 60 | 60 |
| MONOMER: | — | — | — | — |
| WT %: | — | — | — | — |
| ADD TIME, MIN.: | — | — | — | — |
| INITIATOR: | DTBP | 500R | LUP-101 | DTBP |
| WT %: | 0.2 | 0.37 | 0.4 | 0.2 |
| ADD TIME, MIN.: | 60 | 60 | 60 | 60 |
| MIX TIME, MIN.: | 30 | 30 | 30 | 30 |
| VIS INCREASE, %: | 354 | 271 | 243 | 45 |
| ADT: | 16 | 16 | 8 | 8 |

AIMA = N-allyl imidazole

TABLE 5

| CONDITIONS AND RESULTS | EXAMPLE | | |
|---|---|---|---|
| | 47 | 48 | 49 |
| SOLVENT: | 7 - - - MINERAL OIL - - - 6 | | |
| phr: | 2.0 | 2.0 | 2.0 |
| POLYOLEFIN: | ←2053→ | | |
| MANUFACTURER: | ←DuPont→ | | |
| BARREL T (EC): | 180 | 180 | 180 |
| DIE T (EC): | 246 | 248 | 242 |
| SCREW (RPM) | 150 | 250 | 150 |
| MONOMER: | VIMA | VIMA | VIMA |
| phr: | 1.0 | 1.0 | 1.0 |
| INITIATOR: | DTBP | TBP | LUP101 |
| phr: | 0.1 | 0.1 | 0.1 |
| ADT (A): | 1 | 1 | 1 |
| ADT (B): | 2 | 4[1] | 2 |

[1]Dropped to 2 after 24 hours

What is claimed is:

1. A graft copolymer reaction product of two or more nitrogenous, ethylenically unsaturated, aliphatic or aromatic monomers having from 2 to about 50 carbon atoms grafted on a polyolefin, the grafted copolymer having a molar ratio of monomers to polyolefin of at least about 13:1.

2. The graft copolymer reaction product of claim 1, made by a melt-blending reaction, wherein the graft copolymer reaction product has an ADT of at least about 2.

3. The graft copolymer reaction product of claim 1, wherein the graft copolymer reaction product has an ADT of at least about 8.

4. The graft copolymer reaction product of claim 3, wherein the ADT is at least about 16.

5. The graft copolymer reaction product of claim 1, wherein at least one of the monomers is selected from the group consisting of N-vinyl imidazole;
C-vinyl imidazole;
1-vinyl-2-pyrrolidinone;
N-allyl imidazole;
1-vinyl pyrrolidone;
2-vinyl pyridine;
4-vinyl pyridine;
N-methyl-N-vinyl-acetamide;
di-allyl formamide;
N-methyl-N-allyl formamide
N-ethyl-N-allyl formamide;
N-cyclohexyl-N-allyl formamide;
4-methyl-5-vinyl thiazole;
N-allyl di-isooctyl phenothiazine;
2-methyl-1-vinyl imidazole
3-methyl-1-vinyl pyrazole
N-vinyl-purine
N-vinyl piperazines
N-vinyl succinimide
vinyl piperidines
vinyl morpholines.

6. The graft copolymer reaction product of claim 1, wherein one of the monomers is N-vinyl imidazole.

7. The graft copolymer reaction product of claim 1, wherein at least one of the monomers is an oxygen-containing monomer.

8. A graft copolymer reaction product of two or more nitrogenous, ethylenically unsaturated, aliphatic or aromatic monomers having from 2 to about 50 carbon atoms grafted on a polyolefin, wherein the monomers consist essentially of a first monomer and a second monomer.

9. The graft copolymer reaction product of claim 8, wherein the first monomer is vinyl pyridine.

10. The graft copolymer reaction product of claim 8, wherein the second monomer is N-vinyl imidazole.

11. The graft copolymer reaction product of claim 10, wherein the weight ratio of the first monomer to the second monomer is at least 0.4:1.

12. The graft copolymer reaction product of claim 10, wherein the weight ratio of the first monomer to the second monomer is at least 1:1.

13. The graft copolymer reaction product of claim 10, wherein the weight ratio of the first monomer to the second monomer is at least 1.33:1.

14. The graft copolymer reaction product of claim 1, wherein the polyolefin is selected from the group consisting of ethylene-alpha-olefin copolymers, ethylene/propylene/diene polyolefins, terpolymers and isoprene-based copolymers.

15. A method of making a dispersant viscosity index improver, wherein the method comprises:

A. providing a polyolefin, an initiator, and two or more nitrogenous, ethylenically unsaturated, aliphatic or aromatic monomers having from 2 to about 50 carbon atoms;

B. mixing each of the monomers with the polyolefin, thereby forming a mixture; and C. adding sufficient initiator to graft all the monomers to the polyolefin, wherein the initiator is added to the polyolefin at an average rate of addition of less than about 20% of the amount sufficient to graft the monomers to the polyolefin per minute of addition, the addition being carried out at a temperature at about or exceeding the initiation temperature of the initiator; thereby forming a graft copolymer reaction product of the monomers grafted on the polyolefin.

16. The method of claim 15, wherein the addition is carried out at least in part after the mixing and while adding the initiator to the mixture at a rate of addition of less than about 5% of the charge of the monomer per minute of addition.

17. The method of claim 15, wherein the addition is carried out at least in part after the mixing and while adding the initiator to the mixture at a rate of addition of less than about 1% of the charge of the monomers per minute of addition.

18. The method of claim 15, wherein the mixing comprises mixing each of the monomers simultaneously with the polyolefin.

19. The method of claim 15, wherein the mixing comprises mixing the monomers sequentially with the polyolefin.

20. The method of claim 15, wherein the mixing comprises adding the monomers dropwise to the polyolefin.

21. The method of claim 15, wherein the monomers are selected from the group consisting of:

N-vinyl imidazole;
C-vinyl imidazole;
1-vinyl-2-pyrrolidinone;
N-allyl imidazole;
1-vinyl pyrrolidone;
2-vinyl pyridine;
4-vinyl pyridine;

N-methyl-N-vinyl-acetamide;
di-allyl formamide;
N-methyl-N-allyl formamide;
N-ethyl-N-allyl formamide;
N-cyclohexyl-N-allyl formamide;
4-methyl-5-vinyl thiazole;
N-allyl di-isooctyl phenothiazine;
2-methyl-1-vinyl imidazole
3-methyl-1-vinyl pyrazole
N-vinyl-purine
N-vinyl piperazines
N-vinyl succinimide
vinyl piperidines
vinyl morpholines.

22. The method of claim 15, wherein at least one of the monomers is an oxygen-containing monomer.

23. The method of claim 15, wherein the monomers consist essentially of a first monomer and a second monomer.

24. The method of claim 23, wherein the first monomer is vinyl pyridine.

25. The method of claim 23, wherein the second monomer is N-vinyl imidazole.

26. The method of claim 25, wherein the weight ratio of the first monomer to the second monomer is at least 0.4:1.

27. The method of claim 25, wherein the weight ratio of the first monomer to the second monomer is at least 1:1.

28. The method of claim 25, wherein the weight ratio of the first monomer to the second monomer is at least 1.33:1.

29. The method of claim 15, wherein the polyolefin is selected from the group consisting of ethylene-alpha-olefin copolymers, ethylene/propylene/diene polyolefins, terpolymers and isoprene based copolymers.

30. The product produced by the method of claim 15.

31. A method of making a dispersant viscosity index improver, wherein the method comprises:
   A. providing two or more nitrogenous, ethylenically unsaturated, aliphatic or aromatic monomers, and a polyolefin;
   B. providing an amount of an initiator sufficient to graft the monomers to the polyolefin;
   C. melt-blending the monomers, the polyolefin, and the initiator at a temperature and under conditions effective to graft the monomers to the polyolefin.

32. The method of claim 31, wherein the dispersant viscosity index improver has an ADT of at least about 2.

33. The method of claim 31, wherein the monomers are added sequentially after the polyolefin.

34. The method of claim 31, wherein the monomers are added separately and sequentially after the polyolefin.

35. The method of claim 31, wherein the initator is added after all the monomers have been added to the polyolefin.

36. The method of claim 31, wherein the monomers comprise a first monomer and a second monomer, and the monomers are added separately, and a fraction of the initiator is added with the first monomer, and another fraction of the initiator is added with the second monomer.

37. The method of claim 31, wherein at least one of the monomers is selected from the group consisting of
   N-vinyl imidazole;
   C-vinyl imidazole;
   1-vinyl-2-pyrrolidinone;
   N-allyl imidazole;
   1-vinyl pyrrolidone;
   2-vinyl pyridine;
   4-vinyl pyridine;
   N-methyl-N-vinyl-acetamide;
   di-allyl formamide;
   N-methyl-N-allyl formamide;
   N-ethyl-N-allyl formamide;
   N-cyclohexyl-N-allyl formamide;
   4-methyl-5-vinyl thiazole;
   N-allyl di-isooctyl phenothiazine;
   2-methyl-1-vinyl imidazole
   3-methyl-1-vinyl pyrazole
   N-vinyl-purine
   N-vinyl piperazines
   N-vinyl succinimide
   vinyl piperidines
   vinyl morpholines.

38. The method of claim 31, wherein one of the monomers is N-vinyl imidazole.

39. The method of claim 31, wherein at least one of the monomers is an oxygen-containing monomer.

40. The method of claim 31, wherein the monomers consist essentially of a first monomer and a second monomer.

41. The method of claim 40, wherein the second monomer is N-vinyl imidazole.

42. The method of claim 41, wherein the weight ratio of the first monomer to the second monomer is at least 0.4:1.

43. The method of claim 40, wherein the weight ratio of the first monomer to the second monomer is at least 1:1.

44. The method of claim 40, wherein the weight ratio of the first monomer to the second monomer is at least 1.33:1.

45. The method of claim 31, wherein the polyolefin is selected from the group consisting of ethylene-alpha-olefin copolymers, terpolymers and isoprene-based copolymers.

46. The method of claim 31, wherein the polyolefin is an ethylene/propylene/diene polyolefin.

47. The method of claim 31 conducted in an extruder.

48. The product produced by the method of claim 31.

49. A method of making a lubricating oil, wherein the method comprises:
   providing a lubricant base oil;
   blending with said lubricant base oil, as a dispersant viscosity index improver, the graft reaction product of two or more nitrogenous, ethylenically unsaturated, aliphatic or aromatic monomer having from about 2 to about 50 carbon atoms grafted on a polyolefin, said graft reaction product having a weight average molecular weight of from about 20,000 to about 500,000 and a molar proportion of grafted monomer to the polyolefin of at least about 13:1.

50. A lubricating oil comprising:
   a lubricant base oil; and
   as a dispersant viscosity index improver, the graft reaction product of two or more nitrogenous, ethylenically unsaturated, aliphatic or aromatic monomer having from about 2 to about 50 carbon atoms grafted on a polyolefin, said graft reaction product having a weight average molecular weight of from about 20,000 to about 500,000 and a molar proportion of grafted monomer to the polyolefin of at least about 13:1.

51. The graft reaction product of a nitrogenous, ethylenically unsaturated, aliphatic or aromatic monomer having from about 2 to about 50 carbon atoms grafted on a polyolefin, said graft reaction product having a weight average molecular weight of from about 20,000 to about 500,000 and a molar proportion of grafted monomer to the polyolefin of at least about 13:1 and of at most about 120:1.

52. The graft reaction product of claim 51, wherein said molar proportion of grafted monomer to the polyolefin is at most about 80:1.

53. The graft reaction product of claim 51, wherein said molar proportion of grafted monomer to the polyolefin is at most about 60:1.

54. The graft reaction product of claim 51, wherein said molar proportion of grafted monomer to the polyolefin is at most about 50:1.

55. The graft reaction product of claim 51, wherein said molar proportion of grafted monomer to the polyolefin is at most about 40:1.

56. The graft reaction product of claim 51, wherein said molar proportion of grafted monomer to the polyolefin is at most about 30:1.

57. The graft reaction product of claim 51, wherein said molar proportion of grafted monomer to the polyolefin is at most about 26:1.

58. The graft reaction product of claim 51, wherein said molar proportion of grafted monomer to the polyolefin is at most about 20:1.

59. The graft reaction product of claim 51, wherein said molar proportion of grafted monomer to the polyolefin is at least about 15:1.

60. The graft reaction product of claim 51, wherein said molar proportion of grafted monomer to the polyolefin is at least about 17:1.

61. The graft reaction product of claim 51, wherein said molar proportion of grafted monomer to the polyolefin is at least about 20:1.

62. The graft reaction product of claim 51, wherein said molar proportion of grafted monomer to the polyolefin is at least about 24:1.

63. The graft reaction product of claim 51, wherein said molar proportion of grafted monomer to the polyolefin is at least about 28:1.

64. The graft reaction product of claim 51, wherein said molar proportion of grafted monomer to the polyolefin is at least about 30:1.

65. The graft reaction product of claim 51, wherein said molar proportion of grafted monomer to the polyolefin is at least about 40:1.

66. The graft reaction product of claim 51, wherein said molar proportion of grafted monomer to the polyolefin is at least about 50:1.

67. The graft reaction product of claim 51, wherein said molar proportion of grafted monomer to the polyolefin is at least about 60:1.

68. The graft reaction product of claim 51, wherein monomer also comprises at least one oxygen atom.

69. The graft reaction product of an ethylenically-unsaturated, nitrogen- and oxygen-containing monomer grafted on a polyolefin backbone, wherein said monomer is selected from the group consisting of:

1-vinyl-2-pyrrolidinone,
1-vinyl pyrrolidone,
N-methyl-N-vinylacetamide,
di-allyl formamide,
N-methyl-N-allyl formamide,
N-ethyl-N-allyl formamide,
N-cyclohexyl-N-allyl formamide,
N-vinyl succinimide,
Vinylmorpholines,
dimethylaminoethyl methacrylate,
dimethylaminoethyl acrylate,
maleimide,
N-vinyl oxazolidone,
ethyl 2-cyanoacrylate,
N-vinylphthalimide,
N-(1,1-dimethyl-3-oxobutyl) acrylamide,
N-(1,2-dimethyl-1-ethyl-3-oxobutyl) acrylamide,
N-(1,3-diphenyl-1-methyl-3-oxopropyl)acrylamide,
N-(1-methyl-1-phenyl-3-oxobutyl) methacrylamide,
N,N-diethylaminoethyl acrylamide,
2-hydroxyethyl acrylamide,
N-vinylthiopyrrolidone,
3-methyl-1-vinylpyrrolidone,
4-methyl-1-vinylpyrrolidone,
5-methyl-1-vinylpyrrolidone,
3-ethyl-1-vinylpyrrolidone,
3-butyl-1-vinylpyrrolidone,
3,3-dimethyl-1-vinylpyrrolidone,
4,5-dimethyl-1-vinylpyrrolidone,
5,5-dimethyl-1-vinylpyrrolidone,
3,3,5-trimethyl-1-vinylpyrrolidone,
4-ethyl-1-vinylpyrrolidone,
5-methyl-5-ethyl-1-vinylpyrrolidone,
3,4,5-trimethyl-3-ethyl-1-vinylpyrrolidone,
N-dimethylaminopropyl acrylamide,
N-dimethylaminopropyl methacrylamide,
N-methacryloxyethylpyrrolidone,
N-methacryloxyethylmorpholinone,
N-methacryloxyethylmorpholine,
N-maleimide of dimethylaminopropylamine,
N-methacrylamide of aminoethylethyleneurea,
2-vinyl thiobenzothiazole,
2-allylthiobenzothiazole,
2-butenylthiobenzothiazole,
N-vinylphenothiazine,
N-allylphenothiazine,
N-vinyl pyrrolidone,
N-vinyl methyl-5 pyrrolidone,
N-vinylmethyl-3 pyrrolidone,
N-vinylethyl-5 pyrrolidone,
N-vinyldimethyl-5,5-pyrrolidone,
N-vinylphenyl-5 pyrrolidone,
N-allylpyrrolidone,
N-vinylthiopyrrolidone,
N-vinylpiperidone,
N-vinyl-diethyl-6,6-piperidone,
N-vinylcaprolactam,
N-vinylmethyl-7-caprolactam,
N-vinylethyl-7-caprolactam,
N-vinyldimethyl-7,7-caprolactam,
N-vinylthiocaprolactam,
N-allylcaprolactam,
N-vinylcapryllactam, 4-alkyl morpholine,
benzoyl acetonitrile,
hydrocinnamonitrile,
N-vinylpiperazinoacetophenone,
1-(2-methoxyphenyl)-N-vinylpiperazine,
N-vinyl-5-methoxy-2-pyrrolidinone,
4-Methoxy-3-pyrrolin-2-one,
and combinations of said monomers, said graft reaction product having a weight average molecular weight of from about 20,000 to about 500,000 and a molar proportion of grafted monomer to the polyolefin backbone of at least about 13:1.

70. A method of making a dispersant viscosity index improver, wherein the method comprises:
  A. providing a polyolefin, an initiator, and an ethylenically unsaturated, aliphatic or aromatic, oxygen- and nitrogen-containing monomer having from 2 to about 50 carbon atoms;
  B. dissolving said polyolefin in a solvent, forming a solution;
  C. dispersing at least a portion of said monomer in said solution; and
  D. adding at least a portion of said initiator to said solution at an average rate of addition of less than about 20% of the amount sufficient to graft said monomer to said polyolefin per minute of addition, the addition being carried out at a temperature exceeding the initiation temperature of said initiator;
thereby forming a graft reaction product of said monomer on said polyolefin, said graft reaction product having a weight average molecular weight of from about 20,000 to about 500,000 and a molar proportion of grafted monomer to the polyolefin of at least about 13:1.

71. The method of claim 70, wherein said monomer is selected from the group consisting of:
  1-vinyl-2-pyrrolidinone,
  1-vinyl pyrrolidone,
  N-methyl-N-vinylacetamide,
  di-allyl formamide,
  N-methyl-N-allyl formamide,
  N-ethyl-N-allyl formamide,
  N-cyclohexyl-N-allyl formamide,
  N-vinyl succinimide,
  Vinylmorpholines,
  dimethylaminoethyl methacrylate,
  dimethylaminoethyl acrylate,
  maleimide,
  N-vinyl oxazolidone,
  ethyl 2-cyanoacrylate,
  N-vinylphthalimide,
  N-(1,1-dimethyl-3-oxobutyl) acrylamide,
  N-(1,2-dimethyl-1-ethyl-3-oxobutyl) acrylamide,
  N-(1,3-diphenyl-1-methyl-3-oxopropyl)acrylamide,
  N-(1-methyl-1-phenyl-3-oxobutyl) methacrylamide,
  N,N-diethylaminoethyl acrylamide,
  2-hydroxyethyl acrylamide,
  N-vinylthiopyrrolidone,
  3-methyl-1-vinylpyrrolidone,
  4-methyl-1-vinylpyrrolidone,
  5-methyl-1-vinylpyrrolidone,
  3-ethyl-1-vinylpyrrolidone,
  3-butyl-1-vinylpyrrolidone,
  3,3-dimethyl-1-vinylpyrrolidone,
  4,5-dimethyl-1-vinylpyrrolidone,
  5,5-dimethyl-1-vinylpyrrolidone,
  3,3,5-trimethyl-1-vinylpyrrolidone,
  4-ethyl-1-vinylpyrrolidone,
  5-methyl-5-ethyl-1-vinylpyrrolidone,
  3,4,5-trimethyl-3-ethyl-1-vinylpyrrolidone,
  N-dimethylaminopropyl acrylamide,
  N-dimethylaminopropyl methacrylamide,
  N-methacryloxyethylpyrrolidone,
  N-methacryloxyethylmorpholinone,
  N-methacryloxyethylmorpholine,
  N-maleimide of dimethylaminopropylamine,
  N-methacrylamide of aminoethylethyleneurea,
  2-vinyl thiobenzothiazole,
  2-allylthiobenzothiazole,
  2-butenylthiobenzothiazole,
  N-vinylphenothiazine,
  N-allylphenothiazine,
  N-vinyl pyrrolidone,
  N-vinyl methyl-5 pyrrolidone,
  N-vinylmethyl-3 pyrrolidone,
  N-vinylethyl-5 pyrrolidone,
  N-vinyldimethyl-5,5-pyrrolidone,
  N-vinylphenyl-5 pyrrolidone,
  N-allylpyrrolidone,
  N-vinylthiopyrrolidone,
  N-vinylpiperidone
  N-vinyl-diethyl-6,6-piperidone,
  N-vinylcaprolactam,
  N-vinylmethyl-7-caprolactam,
  N-vinylethyl-7-caprolactam,
  N-vinyldimethyl-7,7-caprolactam,
  N-vinylthiocaprolactam,
  N-allylcaprolactam,
  N-vinylcapryllactam,
  4-alkyl morpholine,
  benzoyl acetonitrile,
  hydrocinnamonitrile,
  N-vinylpiperazinoacetophenone,
  1-(2-methoxyphenyl)-N-vinylpiperazine,
  N-vinyl-5-methoxy-2-pyrrolidinone,
  4-Methoxy-3-pyrrolin-2-one,
  and combinations of said monomers.

72. The method of claim 70, wherein said graft reaction product has a viscosity of less than about 13,000 centistokes at 100° C.

73. The method of claim 70, wherein said graft reaction product has an ADT value of at least about 8.

74. The method of claim 70, wherein said graft reaction product has an ADT value of at least about 16.

75. The method of claim 70, wherein said solvent comprises a lubricant base stock.

76. The method of claim 75, wherein said lubricant base stock contains less than about 15% by weight of reactive aromatic constituents.

77. A method of making a dispersant viscosity index improver, comprising the steps of:

A. providing a polyolefin, an initiator, and an ethylenically unsaturated, aliphatic or aromatic, oxygen- and nitrogen-containing monomer having from 2 to about 50 carbon atoms;

B. providing an amount of an initiator sufficient to graft said monomer to said polyolefin;

C. melt-blending a reaction mixture consisting essentially of said monomer, said polyolefin, and said initiator;

said melt-blending step being carried out substantially in the absence of a solvent, at a temperature and under conditions effective to graft said monomer on said polyolefin; said graft reaction product having a weight average molecular weight of from about 20,000 to about 500,000 and a molar proportion of grafted monomer to the polyolefin of at least about 13:1.

78. The method of claim 77, wherein said monomer is selected from the group consisting of:

1-vinyl-2-pyrrolidinone,
1-vinyl pyrrolidone,
N-methyl-N-vinylacetamide,
di-allyl formamide,
N-methyl-N-allyl formamide,
N-ethyl-N-allyl formamide,
N-cyclohexyl-N-allyl formamide,
N-vinyl succinimide,
Vinylmorpholines,
dimethylaminoethyl methacrylate,
dimethylaminoethyl acrylate,
maleimide,
N-vinyl oxazolidone,
ethyl 2-cyanoacrylate,
N-vinylphthalimide,
N-(1,1-dimethyl-3-oxobutyl) acrylamide,
N-(1,2-dimethyl-1-ethyl-3-oxobutyl) acrylamide,
N-(1,3-diphenyl-1-methyl-3-oxopropyl)acrylamide,
N-(1-methyl-1-phenyl-3-oxobutyl) methacrylamide,
N,N-diethylaminoethyl acrylamide,
2-hydroxyethyl acrylamide,
N-vinylthiopyrrolidone,
3-methyl-1-vinylpyrrolidone,
4-methyl-1-vinylpyrrolidone,
5-methyl-1-vinylpyrrolidone,
3-ethyl-1-vinylpyrrolidone,
3-butyl-1-vinylpyrrolidone,
3,3-dimethyl-1-vinylpyrrolidone,
4,5-dimethyl-1-vinylpyrrolidone,
5,5-dimethyl-1-vinylpyrrolidone,
3,3,5-trimethyl-1-vinylpyrrolidone,
4-ethyl-1-vinylpyrrolidone,
5-methyl-5-ethyl-1-vinylpyrrolidone,
3,4,5-trimethyl-3-ethyl-1-vinylpyrrolidone,
N-dimethylaminopropyl acrylamide,
N-dimethylaminopropyl methacrylamide,
N-methacryloxyethylpyrrolidone,
N-methacryloxyethylmorpholinone,
N-methacryloxyethylmorpholine,
N-maleimide of dimethylaminopropylamine,
N-methacrylamide of aminoethylethyleneurea,
2-vinyl thiobenzothiazole,
2-allylthiobenzothiazole,
2-butenylthiobenzothiazole,
N-vinylphenothiazine,
N-allylphenothiazine,
N-vinyl pyrrolidone,
N-vinyl methyl-5 pyrrolidone,
N-vinylmethyl-3 pyrrolidone,
N-vinylethyl-5 pyrrolidone,
N-vinyldimethyl-5,5-pyrrolidone,
N-vinylphenyl-5 pyrrolidone,
N-allylpyrrolidone,
N-vinylthiopyrrolidone,
N-vinylpiperidone,
N-vinyl-diethyl-6,6-piperidone,
N-vinylcaprolactam,
N-vinylmethyl-7-caprolactam,
N-vinylethyl-7-caprolactam,
N-vinyldimethyl-7,7-caprolactam,
N-vinylthiocaprolactam,
N-allylcaprolactam,
N-vinylcapryllactam,
4-alkyl morpholine,
benzoyl acetonitrile,
hydrocinnamonitrile,
N-vinylpiperazinoacetophenone,
1-(2-methoxyphenyl)-N-vinylpiperazine,
N-vinyl-5-methoxy-2-pyrrolidinone,
4-Methoxy-3-pyrrolin-2-one,
and combinations of said monomers.

79. The method of claim 77, wherein said graft reaction product has a viscosity of less than about 13,000 centistokes at 100° C.

80. The method of claim 77, wherein said graft reaction product has an ADT value of at least about 2.

81. The method of claim 77, wherein said graft reaction product has an ADT value of at least about 4.

82. The method of claim 77, wherein said graft reaction product has an ADT value of at least about 8.

83. The method of claim 77, wherein said graft reaction product has an ADT value of at least about 16.

84. A lubricating oil comprising:
a lubricant base oil; and
as a dispersant viscosity index improver, the graft reaction product of a nitrogenous, ethylenically unsaturated, aliphatic or aromatic monomer having from about 2 to about 50 carbon atoms grafted on a polyolefin, said graft reaction product having a weight average molecular weight of from about 20,000 to about 500,000 and a molar proportion of grafted monomer to the polyolefin of at least about 13:1 and of at most about 120:1.

85. The lubricating oil of claim 84, wherein the lubricating oil comprises from about 70% to about 96% by weight of the lubricant base oil and from about 0.25% solids to about 2% solids by weight of the graft reaction product.

86. The lubricating oil of claim 84, wherein the lubricating oil comprises from about 80% to about 95% by weight of the lubricant base oil.

87. The lubricating oil of claim 84, wherein the lubricating oil comprises from about 88% to about 93% by weight of the lubricant base oil.

88. The lubricating oil of claim 84, wherein the lubricating oil comprises from 0.5% solids to about 1.5% solids by weight, of one or more of the grafted reaction products.

89. The lubricating oil of claim 84, wherein the lubricating oil comprises from about 0.25% solids to about 1.2% solids by weight, of one or more of the grafted reaction products.

90. The lubricating oil of claim 85, further comprising from about 0.05% solids to 1.0% solids by weight of one or more polyolefins other than the grafted polyolefins.

91. The lubricating oil of claim 85, further comprising less than about 4% by weight of one or more dispersants which are not grafted polyolefins.

92. A lubricating oil comprising:

A. at least about 70% of a lubricant base oil;

B. at least about 0.25% of a graft reaction product of a nitrogen- and oxygen-containing, ethylenically unsaturated, aliphatic or aromatic monomer having from about 2 to about 50 carbon atoms grafted on a polyolefin, said graft reaction product having a weight average molecular weight of from about 20,000 to about 500,000 and a molar proportion of grafted monomer to the polyolefin of at least about 13:1 and of at most about 120:1;

C. at least about 0.05% solids by weight of one or more polyolefins other than the graft reaction product;

D. from about 0.5% to about 4% by weight of one or more dispersants which are not grafted polyolefins;

E. at least about 0.3% by weight of one or more detergents;

F. at least about 0.01% by weight one or more anti-wear agents;

G. at least about 0.01% by weight of one or more anti-oxidants; and

H. at least about 0.005% of minor ingredients.

* * * * *

UNITED STATES PATENT AND TRADEMARK OFFICE
CERTIFICATE OF CORRECTION

PATENT NO.    : 6,686,321 B2
DATED         : February 3, 2004
INVENTOR(S)   : J. Boden et al.

It is certified that error appears in the above-identified patent and that said Letters Patent is hereby corrected as shown below:

Column 3,
Line 46, reads "The grafted monomer and (Particularly) the" should read -- The Grafted monomer and (particularly) the --

Column 9,
Lines 5, 6 and 7, delete "2,2☐-azobis;" should read -- 2,2'-azobis; --
Line 8, delete "1,1☐-azobus" should read -- 1,1'-azobis --

Column 18,
Line 34, delete "because the on of the grafted" should read -- because the concentration of the grafted --
Line 49, delete "with TEFLON☐ septa" should read -- with TEFLON$^{TM}$ septa --
Line 53, delete "two 20 ☐m particle size" should read -- two 20 $\mu$m particle size --
Line 54, delete "(pore sizes $10^5$ ☐ and $10^3$ ☐)" should read -- (pore sizes $10^5 \mu$ and $10^3 \mu$) --
Line 55, delete "a 20 ☐m particle size" should read -- a 20 $\mu$m particle size --
Line 56, delete "(pore size $10^5$ ☐)" should read -- (pore size $10^5 \mu$) --
Line 57, delete "a Millipore☐ Waters" should read -- a Millipore- Waters --

Column 36,
Line 30, delete "The method of claim 41" should read -- The method of claim 40 --

Signed and Sealed this

First Day of June, 2004

JON W. DUDAS
*Acting Director of the United States Patent and Trademark Office*